(12) United States Patent
Watanabe

(10) Patent No.: US 12,082,136 B2
(45) Date of Patent: Sep. 3, 2024

(54) RADIO COMMUNICATION APPARATUS AND RADIO COMMUNICATION METHOD

(71) Applicant: NEC Corporation, Tokyo (JP)

(72) Inventor: Shingo Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 215 days.

(21) Appl. No.: 17/536,337

(22) Filed: Nov. 29, 2021

(65) Prior Publication Data

US 2022/0174619 A1  Jun. 2, 2022

(30) Foreign Application Priority Data

Nov. 30, 2020  (JP) .................................. 2020-198916

(51) Int. Cl.
*H04W 56/00*  (2009.01)
*H04L 7/04*  (2006.01)

(52) U.S. Cl.
CPC ........... *H04W 56/001* (2013.01); *H04L 7/041* (2013.01)

(58) Field of Classification Search
CPC ............. H04L 27/2662; H04L 27/2675; H04L 27/2666; H04L 25/022; H04L 7/041
See application file for complete search history.

(56) References Cited

U.S. PATENT DOCUMENTS

| | | | | |
|---|---|---|---|---|
| 5,007,088 A | * | 4/1991 | Ooi | H04L 25/03866 380/46 |
| 5,303,234 A | * | 4/1994 | Kou | H04L 1/1874 370/442 |
| 5,717,761 A | | 2/1998 | Yatagai | |
| 8,259,874 B1 | * | 9/2012 | Qi | H04L 27/0014 375/343 |
| 2002/0039886 A1 | * | 4/2002 | Doi | H04B 7/0848 455/25 |
| 2008/0304589 A1 | * | 12/2008 | Tsuruta | H04L 25/03159 375/348 |
| 2011/0033012 A1 | * | 2/2011 | Matsuoka | H04L 27/2662 375/340 |
| 2013/0251173 A1 | | 9/2013 | Ejima et al. | |
| 2021/0288859 A1 | * | 9/2021 | Radosevic | H03M 13/27 |
| 2022/0166580 A1 | * | 5/2022 | Zhu | H04L 5/0007 |

FOREIGN PATENT DOCUMENTS

| | | |
|---|---|---|
| JP | S64-077234 A | 3/1989 |
| JP | H08-195739 A | 7/1996 |
| JP | 2002-16589 A | 1/2002 |
| JP | 2012-124847 A | 6/2012 |

* cited by examiner

*Primary Examiner* — Yee F Lam

(57) ABSTRACT

A radio communication apparatus makes it possible to prevent contents of communication from being intercepted. The radio communication apparatus includes a generation unit configured to generate a first unique word based on operation time information of the radio communication apparatus before communication with a radio communication apparatus is started, and generate, for each radio frame, an ith unique word (i: an integer equal to or greater than two) based on an (i−1)th unique word when the communication is started, and a transmitting unit configured to transmit a first radio frame including the first unique word and an ith radio frame including the ith unique word to the radio communication apparatus.

6 Claims, 14 Drawing Sheets

RADIO COMMUNICATION APPARATUS AND RADIO COMMUNICATION METHOD

INCORPORATION BY REFERENCE

This application is based upon and claims the benefit of priority from Japanese patent application No. 2020-198916, filed on Nov. 30, 2020, the disclosure of which is incorporated herein in its entirety by reference.

TECHNICAL FIELD

The present disclosure relates to a radio communication apparatus and a radio communication method.

BACKGROUND ART

In digital radio communication performed between a radio communication apparatus on a transmitting side and a radio communication apparatus on a receiving side, a transmitted/received radio frame includes a frame synchronization code indicating a code string for synchronizing a frame so that the timing of the start of the transmitted/received radio frame can be detected. The frame synchronization code is also called a unique word.

Note that if a third party, i.e., a person or the like who is different from the user of the radio communication apparatus on the receiving side, detects a unique word used in communication, they can detect data included in a radio frame, thus raising a possibility that contents of the communication could be intercepted. Therefore, as a technology for preventing a third party from intercepting contents of communication, a technology for switching such a unique word has been known (e.g., Patent Literature 1 (Japanese Unexamined Patent Application Publication No. 2012-124847)). Patent Literature 1 discloses that a microphone, which is a radio communication apparatus on the transmitting side, switches a unique word according to a communication mode.

However, in Patent Literature 1, if the communication mode is not changed from the start of the communication to the end of the communication, the same unique word is added to each of radio frames to be transmitted. Therefore, if a third party has found out the communication mode, they may detect the unique word added to radio frames, so contents of the communication could be intercepted. Therefore, studies regarding technologies for preventing third parties from intercepting contents of communication more effectively have been carried out (e.g., Patent Literatures 2 to 4).

Patent Literature 2 (Japanese Unexamined Patent Application Publication No. H01-077234) discloses that a radio communication apparatus on the transmitting side holds a plurality of unique word patterns and adds, to each radio frame, a unique word that is generated according to a unique word pattern selected from the plurality of unique word patterns. Patent Literature 3 (Japanese Unexamined Patent Application Publication No. H08-195739) discloses that a transmitting unit in a communication system adds, to each radio frame, a unique word that is generated based on a reference unique word pattern and a plurality of special unique word patterns. Patent Literature 4 (Japanese Unexamined Patent Application Publication No. 2002-016589) discloses that a transmitting unit in a communication system generates the first unique word based on a reference unique word pattern and a special unique word pattern. Further, Patent Literature 4 also discloses that a pseudo-random pattern based on the special unique word pattern is generated for each radio frame, and the second and subsequent unique words are generated based on the generated pseudo-random pattern and the reference unique word pattern.

In the technologies disclosed in Patent Literatures 2 to 4, unique words added to radio frames are changed on a frame-by-frame basis. A plurality of unique word patterns are used in the technology disclosed in Patent Literature 2. However, since the number of unique word patterns is finite, there is a possibility that a third party may find out a unique word pattern used in the communication by continuously monitoring contents of the communication. When the technology disclosed in Patent Literature 3 or 4 is used, at least the first generated unique word is based on the reference unique word pattern and the special unique word pattern, which are fixed irrespective of the communication, so that a unique word used in each communication is generated in a fixed manner. Therefore, even if the technology disclosed in Patent Literature 3 or 4 is used, there is a possibility that a third party may find out a unique word used in the communication by continuously monitoring contents of the communication. Therefore, even if the technology disclosed in any of Patent Literatures 2 to 4 is used, there is a possibility that a third party may intercept contents of communication.

SUMMARY

The present disclosure has been made in order to solve the above-described problem, and an object thereof is to provide a radio communication apparatus and a radio communication method capable of preventing contents of communication from being intercepted.

In a first example aspect, a radio communication apparatus includes:
  a generation unit configured to generate a first unique word based on operation time information of the radio communication apparatus before communication with another radio communication apparatus is started, and generate, for each radio frame, an ith unique word (i: an integer equal to or greater than two) based on an (i−1)th unique word when the communication is started; and
  a transmitting unit configured to transmit a first radio frame including the first unique word and an ith radio frame including the ith unique word to the other radio communication apparatus.

In a second example aspect, a radio communication apparatus includes:
  a generation unit configured to generate a first reception unique word corresponding to a first transmission unique word based on second operation time information of the radio communication apparatus before communication with another radio communication apparatus is started, the second operation time information corresponding to first operation time information that the other radio communication apparatus uses to generate the first transmission unique word; and
  a receiving unit configured to receive a radio frame including the first transmission unique word based on the first reception unique word, in which
  the generation unit generates, for each radio frame, an ith reception unique word (i: an integer equal to or greater than two) based on an (i−1)th reception unique word when the communication is started, the ith reception unique word corresponding to an ith transmission unique word generated by the other radio communication apparatus, and the receiving unit receives a radio frame including the ith transmission unique word based on the ith reception unique word.

In another example aspect, a radio communication system includes:
a first radio communication apparatus; and
a second radio communication apparatus, in which
the first radio communication apparatus
generates a first transmission unique word based on first operation time information of the first radio communication apparatus before communication with the second radio communication apparatus is started, and generate, for each radio frame, an ith transmission unique word (i: an integer equal to or greater than two) based on an (i−1)th transmission unique word when the communication is started, and
transmits a first radio frame including the first transmission unique word to the second radio communication apparatus, and transmits an ith radio frame including the ith transmission unique word to the second radio communication apparatus, and
the second radio communication apparatus
generates, before the communication is started, a first reception unique word corresponding to the first transmission unique word based on second operation time information of the second radio communication apparatus, corresponding to the first operation time information, and generates, when the communication is started, for each radio frame, an ith reception unique word corresponding to the ith transmission unique word based on an (i−1)th reception unique word, and
receives the first radio frame based on the first reception unique word, and receives the ith radio frame based on the ith reception unique word.

BRIEF DESCRIPTION OF DRAWINGS

The above and other objects, features and advantages of the present disclosure will become more fully understood from the detailed description given hereinbelow and the accompanying drawings which are given by way of illustration only, and thus are not to be considered as limiting the present disclosure.

EXAMPLE EMBODIMENT

Example embodiments according to the present disclosure will be described hereinafter with reference to the drawings. Note that, for clarifying the explanation, the following descriptions and the drawings are partially omitted and simplified as appropriate. Further, the same symbols are assigned to the same elements throughout the drawings, and redundant explanations are omitted as appropriate.

First Example Embodiment

Figure 1:
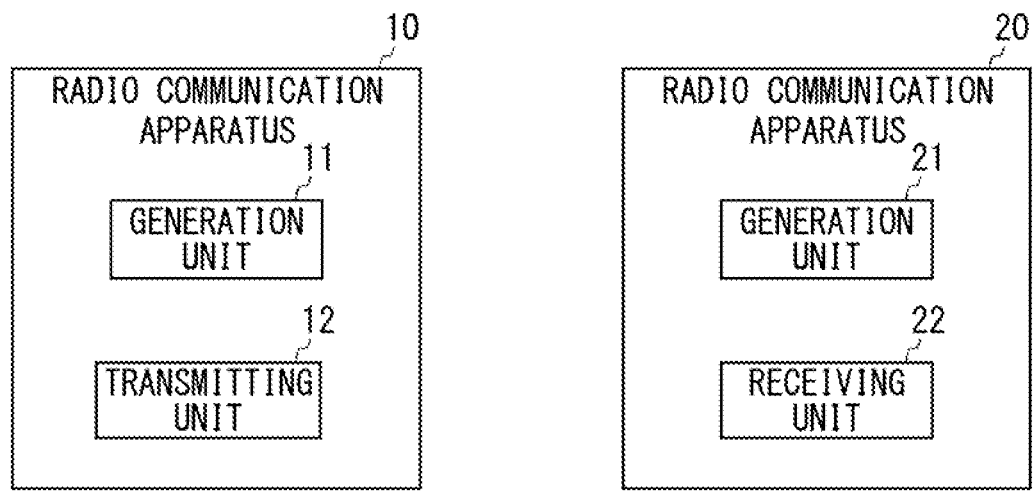
FIG. 1 shows an example of a configuration of a radio communication system according to a first example embodiment.

A configuration of a radio communication system 100 according to a first example embodiment will be described with reference to FIG. 1. FIG. 1 shows an example of the configuration of the radio communication system according to the first example embodiment. The radio communication system 100 includes a radio communication apparatus 10 and a radio communication apparatus 20. The radio communication apparatuses 10 and 20 perform digital radio communication with each other through a radio line.

The radio communication apparatus 10 operates as a radio communication apparatus on the transmitting side, and the radio communication apparatus 20 operates as a radio communication apparatus on the receiving side. Note that the radio communication apparatus 10 can also operate as a radio communication apparatus on the receiving side, and the radio communication apparatus 20 can also operate as a radio communication apparatus on the transmitting side. Therefore, the radio communication apparatus 10 may include a receiving unit (which will be described later) of the radio communication apparatus 20, and the radio communication apparatus 20 may include a transmitting unit (which will be described later) of the radio communication apparatus 10. Further, in the following description, the radio communication apparatus on the transmitting side may be referred to as a transmitting station, and the radio communication apparatus on the receiving side may be referred to as a receiving station.

The radio communication apparatus 10 generates, for each radio frame, a unique word, which is a frame synchronization code, and transmits a radio frame including the generated unique word to the radio communication apparatus 20.

The radio communication apparatus 20 generates, for each radio frame transmitted from the radio communication apparatus 10, a unique word, and receives a radio frame based on the generated unique word.

The radio communication apparatus 10 includes a generation unit 11 and a transmitting unit 12.

The generation unit 11 generates, before communication with the radio communication apparatus 20 is started, a first transmission unique word based on first operation time information of the radio communication apparatus 10. The first transmission unique word is a unique word that is added to a first radio frame and indicates that the radio frame is a first-transmitted radio frame to be transmitted to the radio communication apparatus 20 immediately after the start of the communication with the radio communication apparatus 20. The first operation time information is operation time information used for the operation of the radio communication apparatus 10. The first operation time information may be, for example, time information that is determined by calculating an elapsed time from a reference time by using an operating clock.

Note that the radio communication apparatus 20 also generates a unique word for detecting a radio frame received from the radio communication apparatus 10 (which will be described later). Therefore, in the present disclosure, in order to distinguish between a unique word generated by the radio communication apparatus 10 on the transmitting side and a unique word generated by the radio communication apparatus 20 on the receiving side, the unique word generated by the radio communication apparatus 10 is referred to as a transmission unique word. Further, the unique word generated by the radio communication apparatus 20 is referred to as a reception unique word. The transmission unique word is a unique word generated by the radio communication apparatus on the transmitting side, and is a unique word added to a radio frame transmitted from the radio communication apparatus on the transmitting side. Meanwhile, the reception unique word is a unique word generated by the radio communication apparatus on the receiving side, and is a unique word that the radio communication apparatus on the receiving side uses in order to detect a radio frame to be received and receive the detected radio frame.

When communication with the radio communication apparatus 20 is started, the generation unit 11 generates, for each radio frame, an ith transmission unique word based on an (i−1)th transmission unique word (i: an integer equal to or greater than two). The ith transmission unique word is a transmission unique word that is added to an ith radio frame and indicates that the radio frame is an ith-transmitted radio frame after the communication with the radio communication apparatus 20 is started. The generation unit 11 updates the transmission unique word for each radio frame by generating the ith transmission unique word based on the (i−1)th transmission unique word.

When the communication with the radio communication apparatus 20 is started, the transmitting unit 12 transmits the first radio frame including the first transmission unique word to the radio communication apparatus 20. Further, the transmitting unit 12 transmits the ith radio frame including the ith transmission unique word to the radio communication apparatus 20.

The radio communication apparatus 20 includes a generation unit 21 and a receiving unit 22.

The generation unit 21 generates a first reception unique word corresponding to the first transmission unique word based on second operation time information of the radio communication apparatus 20, which corresponds to the above-described first operation time information, before communication with the radio communication apparatus 10 is started. The first reception unique word is a reception unique word that is used to detect the first transmission unique word included in the first radio frame and receive the first radio frame. The second operation time information is operation time information used for the operation of the radio communication apparatus 20. The second operation time information may be, for example, time information that is determined by calculating an elapsed time from a reference time by using an operating clock.

Further, when the communication with the radio communication apparatus 10 is started, the generation unit 21 generates, for each radio frame, an ith reception unique word, which corresponds to the ith transmission unique word generated by the radio communication apparatus 10, based on an (i−1)th reception unique word. The ith reception unique word is a reception unique word that is used to detect the ith transmission unique word, which has been added to the ith radio frame and indicates that the radio frame is the ith-transmitted radio frame after the communication with the radio communication apparatus 10 is started, and to receive the ith radio frame. The generation unit 21 updates the reception unique word for each radio frame by generating the ith reception unique word based on the (i−1)th reception unique word.

When the communication with the radio communication apparatus 10 is started, the receiving unit 22 receives the radio frame including the first transmission unique word based on the first reception unique word. The receiving unit 22 receives the radio frame including the ith transmission unique word based on the ith reception unique word.

Figure 2:
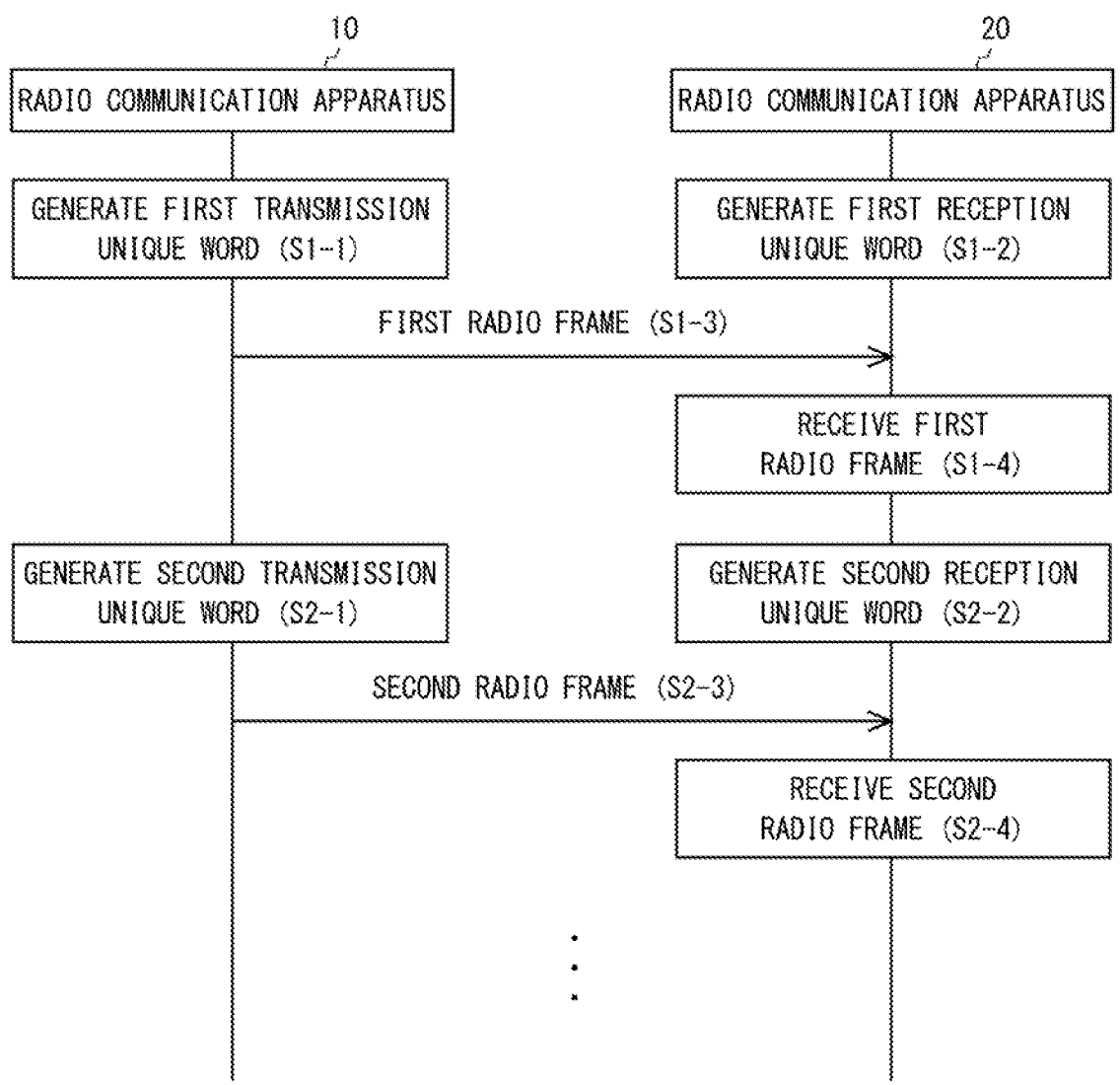
FIG. 2 is a sequence diagram showing an example of operations performed by the radio communication system according to the first example embodiment.

Next, an example of operations performed by the radio communication system 100 will be described with reference to FIG. 2. FIG. 2 is a sequence diagram showing an example of operations performed by the radio communication system according to the first example embodiment.

The generation unit 11 generates, before communication with the radio communication apparatus 20 is started, a first transmission unique word based on first operation time information of the radio communication apparatus 10 (Step S1-1).

The generation unit 21 generates, before the communication with the radio communication apparatus 10 is started, a first reception unique word corresponding to the first transmission unique word based on second operation time information corresponding to the first operation time information (Step S1-2). Note that it is sufficient if the generation unit 21 is able to generate a first reception unique word corresponding to the first transmission unique word, so that the step S1-2 may be performed simultaneously with the step S1-1 or may not be performed simultaneously with the step S1-1.

When the communication with the radio communication apparatus 20 is started, the transmitting unit 12 transmits the first radio frame including the first transmission unique word to the radio communication apparatus 20 (Step S1-3).

When the communication with the radio communication apparatus 10 is started, the receiving unit 22 receives the first radio frame including the first transmission unique word based on the first reception unique word (Step S1-4).

When the communication with the radio communication apparatus 20 is started, the generation unit 11 generates a second transmission unique word for a second radio frame based on the first transmission unique word (Step S2-1).

When the communication with the radio communication apparatus 10 is started, the generation unit 21 generates a second reception unique word corresponding to the second transmission unique word based on the first reception unique word (step S2-2). Note that it is sufficient if the generation unit 21 is able to generate a second reception unique word corresponding to the second transmission unique word, so that the step S2-2 may be performed simultaneously with the step S2-1 or may not be performed simultaneously with the step S2-1.

The transmitting unit 12 transmits the second radio frame including the second transmission unique word to the radio communication apparatus 20 (step S2-3).

The receiving unit 22 receives the second radio frame including the second transmission unique word based on the second reception unique word (Step S2-4).

The radio communication apparatuses 10 and 20 repeat the steps S2-1 to S2-4 on a frame-by-frame basis until the communication is finished.

As described above, since the radio communication apparatus 10 generates a first transmission unique word by using first operation time information of the radio communication apparatus 10, the radio communication apparatus 10 can generate a different first transmission unique word every time it performs communication with the radio communication apparatus 20. Further, since the radio communication apparatus 10 updates the transmission unique word on a frame-by-frame basis, it can prevent a third party from intercepting contents of communication. Therefore, even if a third party continuously monitors the communication between the radio communication apparatuses 10 and 20, they cannot find out the transmission unique word used in the communication between the radio communication apparatuses 10 and 20. Therefore, according to the radio communication apparatus 10 in accordance with the first example embodiment, it is possible to prevent contents of communication from being intercepted.

Further, the radio communication apparatus 20 generates a first reception unique word corresponding to a first transmission unique word based on second operation time information of the radio communication apparatus 20, which corresponds to the first operation time information. The radio communication apparatus 20 generates an ith reception unique word corresponding to an ith transmission unique word based on the first reception unique word. Therefore, even if the radio communication apparatus 10 generates a different transmission unique word for each radio frame and for each communication, the radio communication apparatus 20 can receive a radio frame transmitted from the radio communication apparatus 10. That is, according to the radio communication system 100 including the radio communication apparatuses 10 and 20, it is possible to perform normal communication while preventing a third party from intercepting contents of the communication.

Second Example Embodiment

Next, a second example embodiment will be described. The second example embodiment is a specific example of the first example embodiment.

Configuration Example of Radio Communication System

Figure 3:
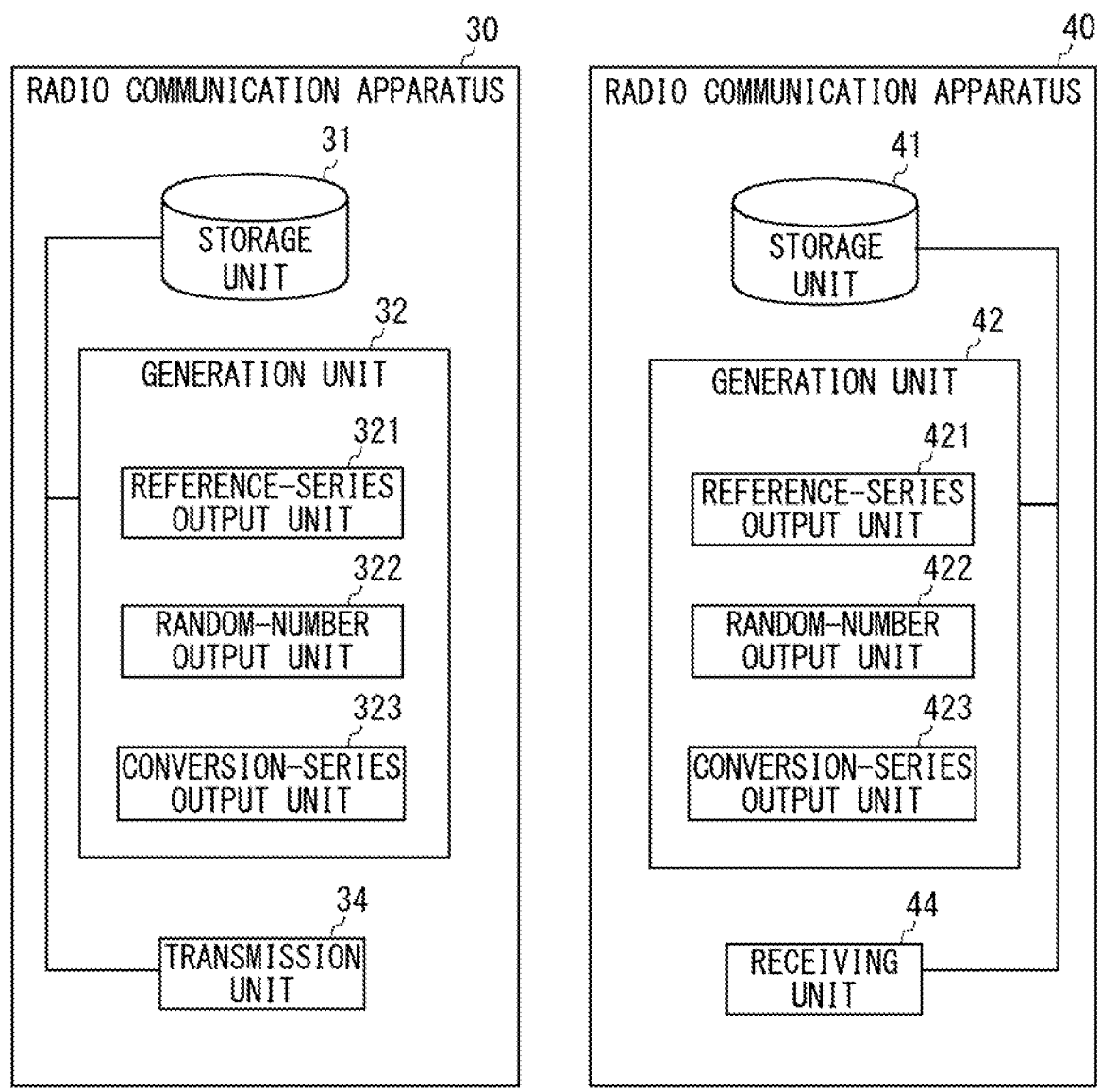
FIG. 3 shows an example of a configuration of a radio communication system according to a second example embodiment.

A configuration of a radio communication system 200 according to the second example embodiment will be described with reference to FIG. 3. FIG. 3 is an example of the configuration of the radio communication system according to the second example embodiment. The radio communication system 200 includes a radio communication apparatus 30 and a radio communication apparatus 40.

The radio communication apparatus 30 corresponds to the radio communication apparatus 10 in the first example embodiment. The radio communication apparatus 30 performs digital radio communication with the radio communication apparatus 40 through a radio line. The radio communication apparatus 30 operates as a transmitting station, which is a radio communication apparatus on the transmission side. Note that the radio communication apparatus 30 may also be able to operate as a radio communication apparatus on the receiving side. Therefore, the radio communication apparatus 30 may include a receiving unit equivalent to that provided in the radio communication apparatus 40. The radio communication apparatus 30 generates a radio frame to be transmitted to the radio communication apparatus 40, and generates, for each radio frame, a transmission UW (Unique Word), which is a frame synchronization code. The radio communication apparatus 30 transmits the radio frame including the generated transmission UW to the radio communication apparatus 40.

The radio communication apparatus 40 corresponds to the radio communication apparatus 20 in the first example embodiment. The radio communication apparatus 40 operates as a receiving station, which is a radio communication apparatus on the receiving side. Note that the radio communication apparatus 40 may also be able to operate as a radio communication apparatus on the transmitting side. Therefore, the radio communication apparatus 40 may include a transmitting unit equivalent to that provided in the radio communication apparatus 30. The radio communication apparatus 40 generates, for each radio frame transmitted from the radio communication apparatus 30, a reception UW, and receives a radio frame including the generated reception UW (i.e., a unique word identical to the generated reception UW).

Note that, in this example embodiment, it is assumed that the operation times of the radio communication apparatuses 30 and 40 are synchronized with each other with an accuracy of a certain error or smaller. That is, it is assumed that the error between transmitting-station operation time information, which indicates the operation time used for the operation of the radio communication apparatus 30, and receiving-station operation time information, which indicates the operation time used for the operation of the radio communication apparatus 40, has a certain value or smaller.

Figure 4:
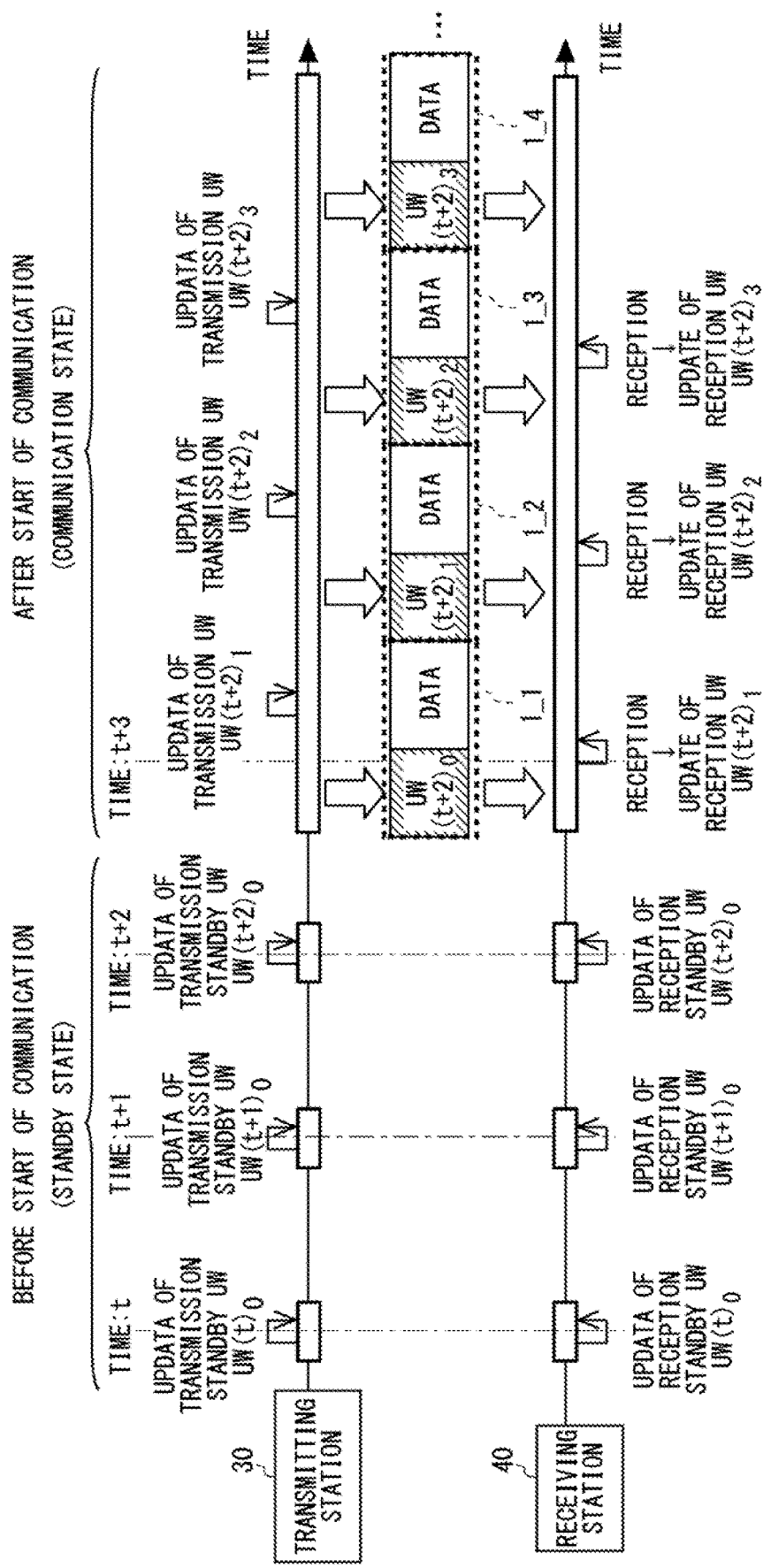
FIG. 4 is a diagram for explaining a flow of updates of UWs in the radio communication apparatus according to the second example embodiment.

Before explaining details of an example of the configuration of the radio communication apparatuses 30 and 40, timings at which UWs are generated in the radio communication apparatuses 30 and 40 and the generated UWs will be described. FIG. 4 is a diagram for explaining a flow of updates of UWs in the radio communication apparatus according to the second example embodiment.

The horizontal axis in FIG. 4 is an axis indicating the time. The upper side of FIG. 4 shows timings at which UWs are generated in the radio communication apparatus 30, which is the transmitting station. The lower side of FIG. 4 shows timings at which UWs are generated in the radio communication apparatus 40, which is the receiving station.

In FIG. 4, $UW(t)_0$ indicates a transmission UW that is generated based on transmitting-station operation time information when the operation time indicated by the transmitting-station operation time information is a time t. Further, for example, $UW(t+2)_2$ indicates a transmission UW which was originally $UW(t+2)_0$, i.e., a transmission UW generated based on the transmitting-station operation time information, and has been updated twice when the operation time indicated by the transmitting-station operation time information is a time (t+2). Note that the above-described matters apply to the reception UW.

In a standby state, which is a state before the start of communication, the radio communication apparatus 30 generates, based on the transmitting-station operation time information, a transmission standby UW that can be used for the first transmission UW for the first radio frame that is transmitted immediately after the start of the communication. The radio communication apparatus 30 generates a transmission standby UW and updates the transmission standby UW at intervals of a predetermined cycle time. Note that the predetermined cycle time may be one second or one minute.

In FIG. 4, when the radio communication apparatus 30 generates a transmission standby UW at a time t, the radio communication apparatus 30 generates $UW(t)_0$ as the transmission standby UW based on the transmitting-station operation time information corresponding to the time t. When the radio communication apparatus 30 generates a transmission standby UW at a time (t+1), the radio communication apparatus 30 generates $UW(t+1)_0$ as the transmission standby UW based on the transmitting-station operation time information corresponding to the time (t+1). When the radio communication apparatus 30 generates a transmission standby UW at a time (t+2), the radio communication apparatus 30 generates $UW(t+2)_0$ as the transmission standby UW based on the transmitting-station operation time information corresponding to the time (t+2).

In a communication state, which is a state after the start of the communication, the radio communication apparatus 30 generates, for each radio frame, an ith transmission UW for an ith radio frame based on an (i−1)th transmission UW. Specifically, in the communication state, the radio communication apparatus 30 updates, for each radio frame, the (i−1)th transmission UW, which is based on the first transmission UW, by using the transmission standby UW generated immediately before the start of the communication as the first transmission UW. The radio communication apparatus 30 generates the ith transmission UW for the ith radio frame by updating the (i−1)th transmission UW.

For example, when communication is started between a time (t+2) and a time (t+3), the radio communication apparatus 30 uses $UW(t+2)_0$, which is the transmission standby UW immediately before the start of the communication, as the first transmission UW, and adds it to the first radio frame 1_1 indicated by thick dotted lines. The radio communication apparatus 30 transmits the radio frame 1_1 including the first transmission UW to the radio communication apparatus 40. Note that, for facilitating the explanation, information other than UWs and data is omitted in FIG. 4.

The radio communication apparatus 30 updates the transmission UW by updating $UW(t+2)_0$ based on $UW(t+2)_0$, which is the first transmission UW and thereby generating $UW(t+2)_1$, which is the second transmission UW to be added to the second radio frame. The radio communication apparatus 30 adds the second transmission UW to the second radio frame 1_2 indicated by thick dotted lines, and transmits the radio frame 1_2 to the radio communication apparatus 40. After that, in a similar manner, the radio communication apparatus 30 updates $UW(t+2)_{i-2}$, which is an (i−1)th transmission UW, and thereby generates an ith transmission UW that is added to an ith radio frame. The radio communication apparatus 30 transmits the ith radio frame including the ith transmission UW to the radio communication apparatus 40.

In the standby state, the radio communication apparatus 40 generates, based on receiving-station operation time information, a reception standby UW that can be used for a reception UW for receiving the first radio frame transmitted immediately after the start of the communication. The radio communication apparatus 40 generates the reception standby UW at the same timing as the timing at which the radio communication apparatus 30 generates the transmission standby UW. The radio communication apparatus 40 generates a reception standby UW and updates the reception standby UW.

The radio communication apparatus 40 is configured so that when information used to generate a reception UW is the same as information used to generate a transmission UW, it can generate a reception UW identical to a transmission UW generated by the radio communication apparatus 30. In this example embodiment, the error between the receiving-station operation time information and the transmitting-station operation time information is within a certain error, and the radio communication apparatus 40 generates a reception standby UW at the same cycle time and at the same generation timing as those in the radio communication apparatus 30. Therefore, the radio communication apparatus 40 generates a reception standby UW identical to the transmission standby UW.

In FIG. 4, when the radio communication apparatus 30 generates a transmission standby UW at a time t, the radio communication apparatus 40 generates, based on the receiving-station operation time information corresponding to the time t, $UW(t)_0$ identical to the transmission UW generated by the radio communication apparatus 30 as the reception standby UW. When the radio communication apparatus 30 generates a transmission standby UW at a time (t+1), the radio communication apparatus 40 generates, based on the receiving-station operation time information corresponding to the time (t+1), $UW(t+1)_0$ identical to the transmission UW generated by the radio communication apparatus 30 as the reception standby UW. When the radio communication apparatus 30 generates a transmission standby UW at a time (t+2), the radio communication apparatus 40 generates, based on the receiving-station operation time information corresponding to the time (t+2), $UW(t+2)_0$ identical to the transmission UW generated by the radio communication apparatus 30 as the reception standby UW.

In the communication state, the radio communication apparatus 40 generates, for each radio frame, an ith reception UW for receiving an ith radio frame based on an (i−1)th reception UW. Specifically, in the communication state, the radio communication apparatus 40 generates, for each radio frame, an (i−1)th reception UW, which is based on the first reception UW, by using the reception standby UW generated immediately before the start of the communication as the first reception UW. The radio communication apparatus 40 generates an ith reception UW for receiving an ith radio frame by updating an (i−1)th reception UW. Note that the radio communication apparatus 40 generates an ith reception UW identical to the ith transmission UW. The radio communication apparatus 40 detects a transmission UW identical to the generated reception UW, and receives a radio frame including the transmission UW identical to the reception UW.

In FIG. 4, when communication is started, the radio communication apparatus 40 detects $UW(t+2)_0$ by using $UW(t+2)_0$, which is the reception standby UW immediately before the start of the communication, as the first reception UW, and receives the first radio frame including $UW(t+2)_0$. Upon receiving the radio frame including $UW(t+2)_0$, the radio communication apparatus 40 generates $UW(t+2)_1$ as the second reception UW by updating $UW(t+2)_0$, which is the first reception UW. After that, in a similar manner, upon receiving an (i−1)th radio frame, the radio communication apparatus 40 generates an ith reception UW for receiving an ith radio frame by updating $UW(t+2)_{i-2}$, which is an (i−1)th reception UW. The radio communication apparatus 40 detects an ith transmission UW identical to the ith reception UW, and receives an ith radio frame including the ith transmission UW.

As described above, in the standby state, the radio communication apparatus 30 periodically generates the first transmission UW based on the transmitting-station operation time information, and thereby generates a different first transmission UW for each communication. By doing so, the radio communication apparatus 30 prevents a third party from intercepting the first radio frame. Upon entering a communication state, the radio communication apparatus 30 generates a different transmission UW for each communication and for each radio frame by updating the first transmission UW, which is different for each communication, for each radio frame, and thereby prevents a third party from intercepting the second and subsequent radio frames.

Further, the radio communication apparatus 40 is configured to generate a reception UW identical to a transmission UW generated by the radio communication apparatus 30, so that the radio communication apparatus 40 can normally receive a radio frame even when a radio frame including a different transmission UW is transmitted for each communication and for each radio frame. As described above, in this example embodiment, the radio communication apparatus 40 can carry out normal communication while preventing a third party from intercepting a radio frame.

Configuration Example of Radio Communication Apparatus

Next, an example of the configuration of the radio communication apparatus 30 will be described by referring to FIG. 3 again. The radio communication apparatus 30 includes a storage unit 31, a generation unit 32, and a transmitting unit 34.

The storage unit 31 stores transmitting-station operation time information that indicates an operation time used for the operation of the radio communication apparatus 30. The transmitting-station operation time information may be determined based on a reference time and an operating clock used for the operation of the radio communication apparatus 30. The operating clock may calculate an elapsed time from the reference time and determine the transmitting-station operation time information.

The transmitting-station operation time information may be composed of 26 bits, i.e., include 9 bits for a date (a month and a day) and 17 bits for a time (an hour, a minute, and a second). The transmitting-station operation time information may be composed of, for example, 4 bits indicating a month (January to December), 5 bits indicating a day (1st to 31st), 5 bits indicating an hour (0 to 23), 6 bits indicating a minute (0 to 59), and 6 bits indicating a second (0 to 59).

The generation unit 32 corresponds to the generation unit 11 in the first example embodiment. The generation unit 32 generates a transmission standby UW based on the transmitting-station operation time information before communication with the radio communication apparatus 40 is started. The generation unit 32 generates a transmission standby UW at intervals of a predetermined cycle time based on transmitting-station operation time information, and periodically updates the transmission standby UW. The transmission standby UW is a transmission UW that can be used as the first transmission UW to be added to the first radio frame which is transmitted immediately after the start of the communication. That is, in the standby state before the communication with the radio communication apparatus 40 is started, the generation unit 32 generates a transmission standby UW at intervals of a predetermined cycle time based on the transmitting-station operation time information and thereby updates the transmission standby UW.

When the communication with the radio communication apparatus 40 is started, the generation unit 32 generates, for each radio frame, an ith transmission UW to be added to an ith-transmitted radio frame after the start of the communication (i.e., a radio frame that is transmitted ith after the start of the communication) based on an (i−1)th transmission UW. When data is input to the radio communication apparatus 30 and the state of the radio communication apparatus 30 changes to a communication state, the generation unit 32 determines that communication with the radio communication apparatus 40 is started. When the communication with the radio communication apparatus 40 is started, the generation unit 32 uses the transmission standby UW generated immediately before the communication is started as the first transmission UW, updates the first transmission UW (i−1) times on a frame-by-frame basis, and thereby generates an ith transmission UW. It is considered that since the transmission standby UW is used as the first transmission UW, the generation unit 32 generates the ith transmission UW by updating the transmission standby UW generated immediately before the communication is started (i−1) times on a frame-by-frame basis.

The generation unit 32 includes a reference-series output unit 321, a random-number output unit 322, and a conversion-series output unit 323.

The reference-series output unit 321 is configured so as to be able to output a random number reference series, which is a pseudo-random number series, and outputs the random number reference series to the random-number output unit 322. In a standby state, the reference-series output unit 321 outputs the random number reference series, which is a pseudo-random number series, based on transmitting-station operation time information. Note that, in the following description, a random number reference series based on operation time information (transmitting-station operation time information or receiving-station operation time information) is referred to as a first random number reference series. Further, a random number reference series based on the first random number reference series is referred to as a second random number reference series, and a random number reference series based on an (i−1)th random number reference series is referred to as an ith random number reference series.

The reference-series output unit 321 includes a random-number reference-series generation circuit 50 that outputs a random number reference series, which is a pseudo-random number series, and generates and outputs the random number reference series by using the random-number reference-series generation circuit 50.

Figure 5:
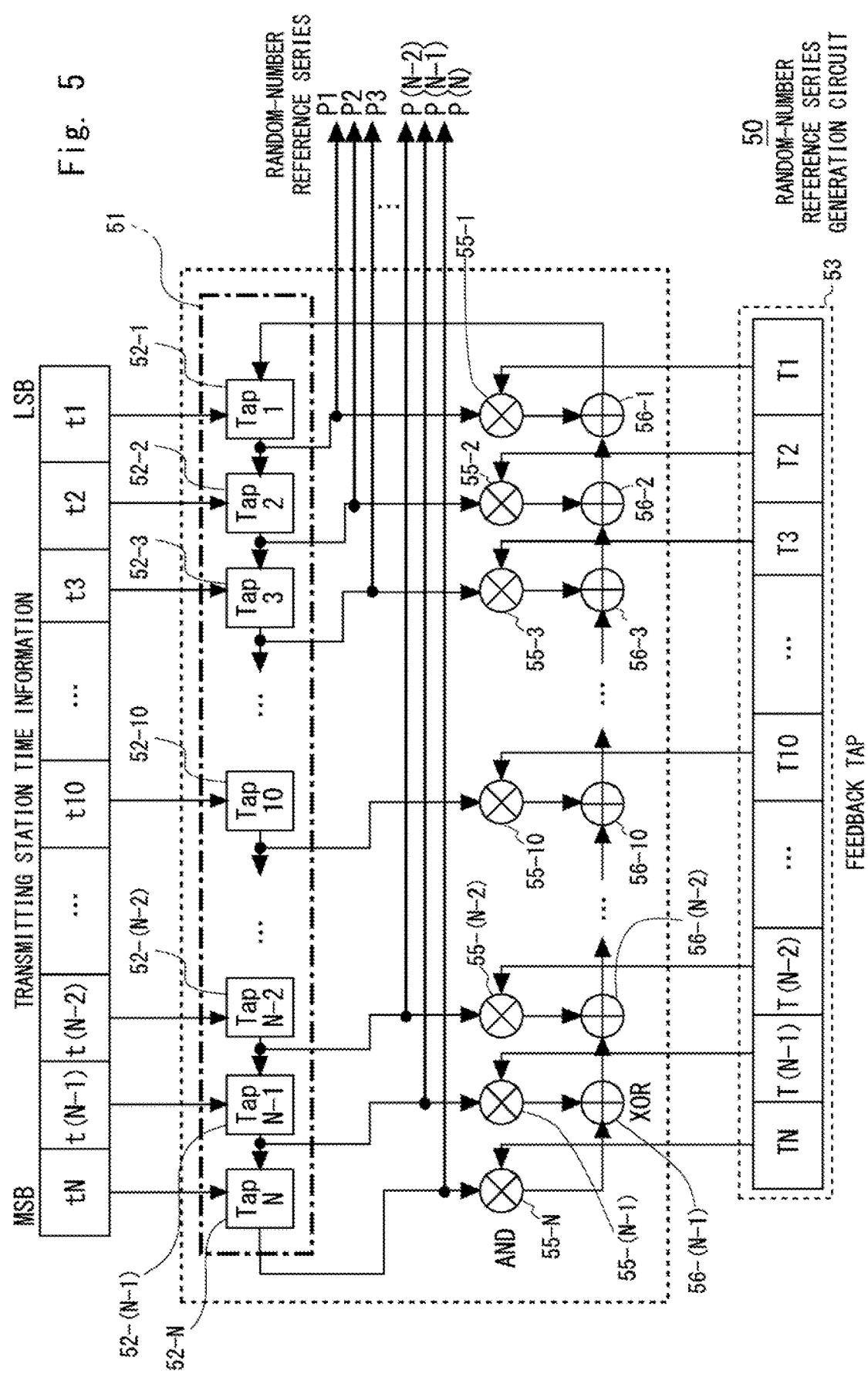
FIG. 5 shows an example of a configuration of a random number reference string generation circuit according to the second example embodiment.

An example of a configuration of the random-number reference-series generation circuit 50 will be described hereinafter with reference to FIG. 5. FIG. 5 shows an example of the configuration of the random-number reference-series generation circuit according to the second example embodiment.

The random-number reference-series generation circuit 50 includes a shift register 51, a feedback tap 53, AND circuits 55-1 to 55-N, and XOR (exclusive or) circuits 56-1 to 56-(N−1). Note that N is an integer equal to or greater than two.

The shift register 51 includes taps 52-1 to 52-N. The number of taps provided in the shift register 51 corresponds to the number of bits constituting the transmitting-station operation time information. For example, when the transmitting-station operation time information is composed of 26 bits, N is 26 and the shift register 51 includes taps 52-1 to 52-26.

The shift register 51 inputs each of a plurality of bits constituting the transmitting-station operation time information to a respective one of the taps 52-1 to 52-N. For example, assume that the transmitting-station operation time information is composed of 26 bits, and the shift register 51 includes taps 52-1 to 52-26. When the information indicating a month is composed of four bits, the shift register 51 inputs each of the four bits indicating the month into a respective one of the taps 52-1 to 52-4. When the information indicating a day is composed of five bits, the shift register 51 inputs each of the five bits indicating the day to a respective one of the taps 52-5 to 52-9. When the information indicating an hour is composed of five bits, the shift register 51 inputs each of the five bits indicating the hour to a respective one of the taps 52-10 to 52-14. When the information indicating a minute is composed of six bits, the shift register 51 inputs each of the six bits indicating minutes to a respective one of the taps 52-15 to 52-20. When the information indicating a second is composed of six bits, the shift register 51 inputs each of the six bits indicating the second to a respective one of the taps 52-21 to 52-26. Note that the shift register 51 may input the bits indicating the second, those indicating the minute, those indicating the hour, those indicating the day, and those indicating the month in ascending order of tap numbers of the taps provided in the shift register 51.

A clock signal is input to the shift register 51, and the value of each of the bits constituting the transmitting-station operation time information input to the taps 52-1 to 52-N is successively transmitted in synchronization with the clock signal. The clock signal is supplied from a clock provided in the random-number reference-series generation circuit 50 and changes at a constant frequency in a repeated manner. The shift register 51 transmits (outputs) the value of a tap 52-$m$ (m: 1 to N−1) to a tap 52-(m+1) and an AND circuit 55-$m$ by advancing the clock time of the clock provided in the random-number reference-series generation circuit 50 one by one. Further, the shift register 51 transmits (outputs) the value of a tap 52-N to an AND circuit 55-N by advancing the clock time of the clock one by one. In other words, the shift register 51 successively shifts the shift register 51 itself by advancing the clock time one by one. Further, the shift register 51 outputs the values of the taps 52-1 to 52-N to the reference-series output unit 321 by advancing the clock time of the clock one by one. By advancing the clock time once (i.e., by one clock), the shift register 51 outputs the values of the taps as values P1 to PN, respectively, constituting the random number reference series.

Regarding the feedback tap 53, among the taps 52-1 to 52-N, taps of which the tap values of the taps 52-1 to 52-N are fed back to the shift register 51 are designated. The feedback tap 53 is configured so that, for example, 0 or 1 is set for each of the taps 52-1 to 52-N. In the feedback tap 53, among the AND circuits 55-1 to 55-N, taps of which tap values are fed back are designated by inputting 1 to each of the AND circuits corresponding to the taps of which tap values are fed back and inputting 0 to each of the AND circuits corresponding to the taps of which tap values are not fed back.

The AND circuits 55-1 to 55-N are provided so that they correspond to the taps 52-1 to 52-N, respectively, provided in the shift register 51. Each of the AND circuits 55-1 to 55-N receives a value output from a respective one of the taps 52-1 to 52-N and a value output from a respective bit of the feedback tap 53, and multiplies the value output from the respective one of the taps 52-1 to 52-N and the value output from the respective bit of the feedback tap 53. Each of the AND circuits 55-1 to 55-(N−1) outputs, to a respective one of the XOR circuits 56-1 to 56-(N−1), a value obtained by multiplying the value output from the respective one of the taps 52-1 to 52-1 (N−1) by the value received from the respective bit of the feedback tap 53. An AND circuit 55-N outputs, to an XOR circuit 56-(N−1), a value obtained by multiplying a value output from a tap 52-N by a value received from a respective bit of the feedback tap 53.

The XOR circuits 56-1 to 56-(N−1) are provided so that they correspond to the AND circuits 55-1 to 55-(N−1), respectively. The AND circuits 55-1 to 55-N and the XOR circuits 56-1 to 56-(N−1) form an arithmetic circuit that calculates an exclusive OR (i.e., an exclusive disjunction) of values output from the taps of which tap values are fed back, which are designated by the feedback tap 53, and feeds back the calculated values. An XOR circuit 56-(N−1) calculates an exclusive OR of the value output from the AND circuit 55-N and the value output from the AND circuit 55-(N−1), and outputs the calculated value to the XOR circuit 56-(N−2). The XOR circuits 56-2 to 56-(N−2) calculate exclusive ORs of the values output from the XOR circuits 56-3 to 56-(N−1), respectively, and the values output from the AND circuits 55-2 to 55-(N−2), respectively. The XOR circuits 56-2 to 56-(N−2) output the calculation results to the XOR circuits 56-1 to 56-(N−3), respectively. The XOR circuit 56-1 calculates an exclusive OR of the value output from XOR circuit 56-2 and the value output from AND circuit 55-1, and feeds back the calculation result to the tap 52-1.

In a standby state, the reference-series output unit 321 inputs the transmitting-station operation time information to the shift register 51 of the random-number reference-series generation circuit 50 at intervals of a predetermined cycle time and at timings at which a transmission standby UW is generated. The reference-series output unit 321 shifts the shift register 51 a predetermined number of times by advancing the clock time of the clock provided in the random-number reference-series generation circuit 50 the predetermined number of times. After shifting the shift register 51 the predetermined number of times, the reference-series output unit 321 generates a first random number reference series by combining values P1 to PN output from the taps 52-1 to 52-N, and outputs the first random number reference series to the random-number output unit 322. After outputting the first random number reference series, the reference-series output unit 321 holds (i.e., retains) each of the values of the taps 52-1 to 52-N of the shift register 51.

When communication with the radio communication apparatus 40 is started, the reference-series output unit 321 advances the clock time of the clock provided in the random-number reference-series generation circuit 50 once in the state in which the corresponding values of the first random number reference series are held in the taps 52-1 to 52-N. After the shift register 51 is shifted once, the reference-series output unit 321 generates a second random number reference series by combining the values P1 to PN output from the taps 52-1 to 52-N. The reference-series output unit 321 outputs the second random number reference series to the random-number output unit 322. After outputting the second random number reference series, the reference-series output unit 321 holds each of the values of the taps 52-1 to 52-N.

After that, the reference-series output unit 321 generates an (i−1)th transmission UW in a similar manner, holds each of the values of the taps 52-1 to 52-N, and advances the clock time of the clock provided in the random-number reference-series generation circuit 50 once before generating a radio frame. After the shift register 51 is shifted once, the reference-series output unit 321 generates an ith random number reference series by combining the values P1 to PN output from the taps 52-1 to 52-N. The reference-series output unit 321 outputs the ith random number reference series to the random-number output unit 322. After outputting the ith random number reference series, the reference-series output unit 321 holds each of the values of the taps 52-1 to 52-N.

Note that when the reference-series output unit 321 outputs the transmission standby UW and the transmission UW, it may store each of the values of the taps 52-1 to 52-N of the shift register 51 in the storage unit 31. Then, the reference-series output unit 321 may acquire each of the values of the taps 52-1 to 52-N from the storage unit 31 at a timing at which a transmission UW is generated, and input the acquired transmission UW to the shift register 51.

The random-number output unit 322 will be described by referring to FIG. 3 again. The random-number output unit 322 holds a random-number table T1. The random-number output unit 322 receives the first random number reference series output from the reference-series output unit 321, and outputs a first output value to the conversion-series output unit 323 based on the random-number table T1. Further, the random-number output unit 322 receives the ith random number reference series output from the reference-series output unit 321, and outputs an ith output value to the conversion-series output unit 323 based on the random-number table T1.

Figure 6:
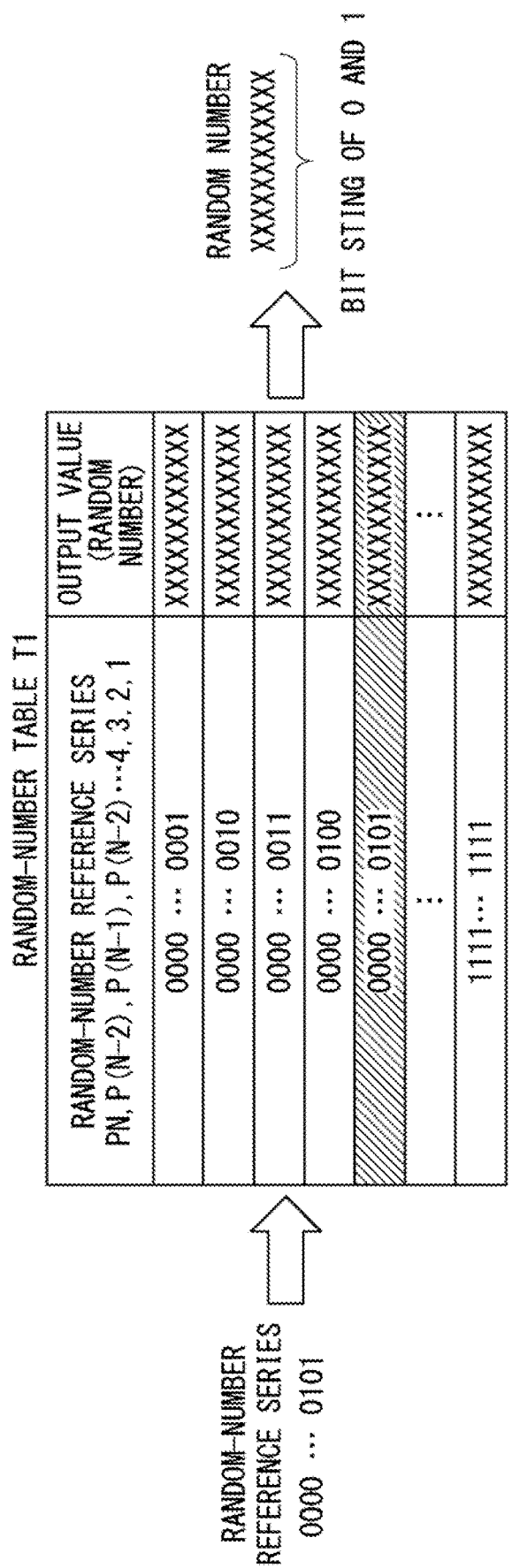
FIG. 6 is a diagram for explaining an example of a random number table according to the second example embodiment.

The random-number table T1 will be described hereinafter with reference to FIG. 6. FIG. 6 is a diagram for explaining an example of the random-number table according to the second example embodiment.

The random-number table T1 includes a left column in which candidate random number reference series that the reference-series output unit 321 can output are set (i.e., recorded), and a right column in which output values corresponding to input random number reference series are set. As the output values, for example, values corresponding to the candidate random number reference series are set, and are determined by generating random numbers in advance. As an output value, for example, a 10-bit value composed of a bit string of 0 and 1 is set. Note that the output value is not limited to 10-bit values, but may be a value having 26 bits or more. That is, the output value may have an arbitrary number of bits.

For example, when the reference-series output unit 321 outputs a value "0000 . . . 0101" as a random number reference series, the random-number output unit 322 receives the value "0000 . . . 0101" output from the reference-series output unit 321. The random-number output unit 322 searches the left column of the random-number table T1 for the value "0000 . . . 0101", determines (i.e., retrieves) an output value corresponding to the value "0000 . . . 0101" from the right column of the random-number table T1, and outputs the determined output value to the conversion-series output unit 323.

The conversion-series output unit 323 will be described by referring to FIG. 3 again. The conversion-series output unit 323 receives an output value output from the random-number output unit 322 and outputs a conversion series, which is a pseudo-random number series. The conversion-series output unit 323 outputs a first conversion series based on the first output value as a transmission standby UW that can be used as the first transmission UW, and outputs an ith conversion series based on an ith output value as an ith transmission UW.

The conversion-series output unit 323 includes a conversion-series generation circuit 80 that outputs a pseudo-random number series, and generates and outputs a conversion series by using the conversion-series generation circuit 80.

Figure 7:
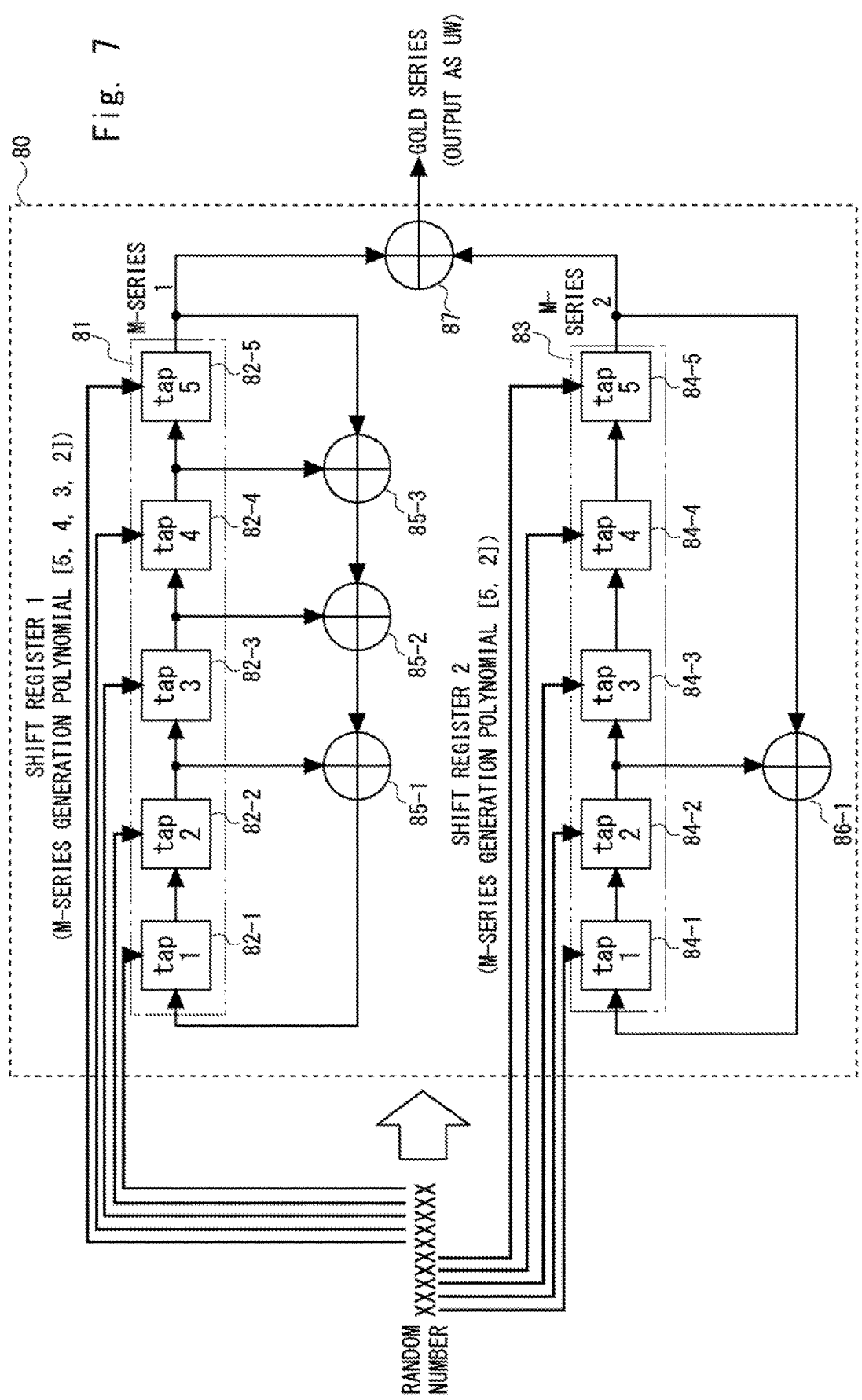
FIG. 7 shows an example of a configuration of a conversion string generation circuit according to the second example embodiment.

An example of a configuration of the conversion-series generation circuit 80 will be described hereinafter with reference to FIG. 7. FIG. 7 shows an example of the configuration of the conversion-series generation circuit according to the second example embodiment.

The conversion-series generation circuit 80 is a circuit that outputs a GOLD series having a series length of 31 bits. Note that the conversion-series generation circuit 80 may be a circuit that outputs an M-series or any other series, or any series having an arbitrary series length other than 31 bits. The conversion-series generation circuit 80 includes shift registers 81 and 83, and XOR circuits 85-1, 85-2, 85-3, 86-1 and 87.

The shift register 81 includes taps 82-1 to 82-5. The shift register 81 inputs lower five bits of an output value output from the random-number output unit 322 to the taps 82-1 to 82-5, respectively. For example, the shift register 81 inputs lower five bits, i.e., first to fifth bits, of an output value output from the random-number output unit 322 to the taps 82-1 to 82-5, respectively.

The shift register 83 includes taps 84-1 to 84-5. The shift register 83 inputs upper five bits of an output value output from the random-number output unit 322 to the taps 84-1 to 84-5, respectively. For example, the shift register 83 inputs upper five bits, i.e., first to fifth bits, of an output value output from the random-number output unit 322 to the taps 84-1 to 84-5, respectively.

A clock signal is input to the shift registers 81 and 83, and values input to the taps 82-1 to 82-5 and the taps 84-1 to 84-5 are successively transmitted in synchronization with the clock signal. The clock signal is supplied by a clock provided in the conversion-series generation circuit 80 and changes at a constant frequency in a repeated manner.

The shift register 81 successively shifts the shift register 81 itself by advancing the clock time of the clock provided in the conversion-series generation circuit 80 one by one. The shift register 81 transmits (outputs) the value of the tap 82-1 to the tap 82-2 by advancing the clock time of the clock one by one. The shift register 81 transmits the value of the tap 82-2 to the tap 82-3 and the XOR circuit 85-1 by advancing the clock time one by one. The shift register 81 transmits the value of the tap 82-3 to the tap 82-4 and the XOR circuit 85-2 by advancing the clock time one by one. The shift register 81 transmits the value of the tap 82-4 to the tap 82-5 and the XOR circuit 85-3 by advancing the clock time one by one. The shift register 81 transmits the value of the tap 82-5 to the XOR circuits 85-3 and the XOR circuit 87 by advancing the clock time one by one.

The shift register 83 successively shifts the shift register 83 itself by advancing the clock time of the clock provided in the conversion-series generation circuit 80 one by one. The shift register 83 transmits the value of the tap 84-1 to the tap 84-2 by advancing the clock time of the clock one by one. The shift register 83 transmits the value of the tap 84-2 to the tap 84-3 and the XOR circuit 86-1 by advancing the clock time of the clock provided in the conversion-series generation circuit 80 one by one. The shift register 83 transmits the value of the tap 84-3 to the tap 84-4 by advancing the clock time one by one. The shift register 83 transmits the value of the tap 84-4 to the tap 84-5 by advancing the clock time one by one. The shift register 83 transmits the value of the tap 84-5 to the XOR circuits 86-1 and 87 by advancing the clock time one by one.

The XOR circuit 85-1 calculates an exclusive OR of the value transmitted (output) from the tap 82-2 and the value output from the XOR circuit 85-2, and outputs the calculation result to the tap 82-1. The XOR circuit 85-2 calculates an exclusive OR of the value transmitted (output) from the tap 82-3 and the value output from the XOR circuit 85-3, and outputs the calculation result to the XOR circuit 85-1. The XOR circuit 85-3 calculates an exclusive OR of the values transmitted (output) from the taps 82-4 and 82-5, and outputs the calculation result to the XOR circuit 85-2.

The XOR circuit 86-1 calculates an exclusive OR of the values transmitted (output) from the taps 84-2 and 84-5, and outputs the calculation result to the tap 84-1.

The XOR circuit 87 calculates an exclusive OR of the value output from the tap 82-5 and the value output from the tap 84-5, and outputs the calculation result to the conversion-series output unit 323.

Note that the number of XOR circuits provided in the conversion-series generation circuit 80 and the positions where they are disposed are determined based on one preferred pair selected for a GOLD series that is generated by using the conversion-series generation circuit 80. The preferred pair for the conversion-series generation circuit 80 is composed of an M-series with an M-series generation polynomial of [5, 4, 3, 2] and an M-series with an M-series generation polynomial of [5, 2]. Therefore, the number of XOR circuits, which are provided so as to correspond to the bits of the shift register 81, is three. The XOR circuit 85-3 is disposed at a position where an exclusive OR of the value of the tap 82-4 and the value of the tap 82-5 is calculated. The XOR circuit 85-2 is disposed at a position where an exclusive OR of the value of the tap 82-3, the value of the tap 82-4, and the value of the tap 82-5 is calculated. The XOR circuit 85-1 is disposed at a position where an exclusive OR of the value of the tap 82-2, the value of the tap 82-3, the value of the tap 82-4, and the value of the tap 82-5 is calculated. Further, the number of XOR circuits, which are provided so as to correspond to the bits of the shift register 83, is one, and the XOR circuit 86-1 is disposed at a position where an exclusive OR of the value of the tap 84-2 and the value of the tap 84-5 is calculated. Note that the preferred pair for the conversion-series generation circuit 80 is not limited to the above-described two M-series generation polynomials. That is, the conversion-series generation circuit 80 can be a circuit composed of a different selectable preferred pair(s).

In a standby state, the conversion-series output unit 323 inputs the first output value output from the random-number output unit 322 to the shift registers 81 and 83 of the conversion-series generation circuit 80 at intervals of a predetermined cycle time and at timings at which a transmission standby UW is generated. The conversion-series output unit 323 shifts each of the shift registers 81 and 83 once (i.e., by one bit) by advancing the clock time of the clock provided in the conversion-series generation circuit 80 once (i.e., by one clock). The conversion-series output unit 323 holds the value output from the XOR circuit 87. The conversion-series output unit 323 further shifts each of the shift registers 81 and 83 30 times by further advancing the clock time 30 times, so that 31 values are output in total from the XOR circuit 87. The conversion-series output unit 323 holds the values output from the XOR circuit 87 every time the shift registers 81 and 83 are shifted. The conversion-series output unit 323 generates a GOLD series by combining the 31 values output from the XOR circuit 87, and outputs the generated GOLD series to the transmitting unit 34 as a transmission standby UW that can be used as the first transmission UW. Note that, in the following description, a GOLD series output based on the first output value is referred to as a first GOLD series, and a GOLD series output based on an ith output value is referred to as an ith GOLD series.

When communication with the radio communication apparatus 40 is started, the conversion-series output unit 323 inputs an ith output value output from the random-number output unit 322 to the shift registers 81 and 83 of the conversion-series generation circuit 80. The conversion-series output unit 323 shifts the shift registers 81 and 83 31 times by advancing the clock time of the clock provided in the conversion-series generation circuit 80 31 times. The conversion-series output unit 323 holds the value output from the XOR circuit 87 every time the shift registers 81 and 83 are shifted. The conversion-series output unit 323 generates an ith GOLD series by combining the 31 values output from the XOR circuit 87, and outputs the ith GOLD series to the transmitting unit 34 as an ith transmission UW.

The transmitting unit 34 will be described by referring FIG. 3 again. The transmitting unit 34 corresponds to the transmitting unit 12 in the first example embodiment. The transmitting unit 34 changes the state of the radio communication apparatus 30 to a communication state when data is input to an input device, such as a microphone, provided in the radio communication apparatus 30, or when data is input from other communication apparatuses. The transmitting unit 34 divides data to be transmitted to the radio communication apparatus 40 into those for respective radio frames.

The transmitting unit 34 uses the transmission standby UW generated immediately before the communication with the radio communication apparatus 40 is started as the first transmission UW, and generates a first radio frame including the first transmission UW and transmission data for first radio data. The transmitting unit 34 transmits the first radio frame to the radio communication apparatus 40. The transmitting unit 34 generates an ith radio frame including an ith transmission UW and transmission data for ith radio data. The transmitting unit 34 transmits the ith radio frame to the radio communication apparatus 40. Note that the transmitting unit 34 may transmit, to the radio communication apparatus 40, a radio frame including a symbol synchronization code, which is a code string for detecting a symbol timing of a modulation signal. The symbol synchronization code may also be referred to as an SSW (Symbol Sync Word).

Next, an example of a configuration of the radio communication apparatus 40 will be described. The configuration of the radio communication apparatus 40 is basically similar to that of the radio communication apparatus 30. Therefore, the example of the configuration of the radio communication apparatus 40 will be described while omitting descriptions of structures/components that are the same as those in the example of the configuration of the radio communication apparatus 30.

The radio communication apparatus 40 includes a storage unit 41, a generation unit 42, and a receiving unit 44.

The storage unit 41 stores receiving-station operation time information that indicates an operation time used for the operation of the radio communication apparatus 40. The receiving-station operation time information may be determined based on a reference time and an operating clock used for the operation of the radio communication apparatus 40, and the operating clock may calculate an elapsed time from the reference time and determine the receiving-station operation time information. The receiving-station operation time information is operation time information corresponding to the transmitting-station operation time information, and the error from the transmitting-station operation time information is within a certain error.

The receiving-station operation time information may be composed of 26 bits, i.e., include 9 bits for a date (a month and a day) and 17 bits for a time (an hour, a minute, and a second). The receiving-station operation time information may be composed of, for example, 4 bits indicating a month (January to December), 5 bits indicating a day (1st to 31st), 5 bits indicating an hour (0 to 23), 6 bits indicating a minute (0 to 59), and 6 bits indicating a second (0 to 59).

The generation unit 42 corresponds to the generation unit 21 in the first example embodiment. The generation unit 42 is configured so as to be able to generate a reception UW identical to the transmission UW generated by the generation unit 32. Before communication with the radio communication apparatus 30 is started, the generation unit 42 generates a reception standby UW corresponding to the transmission standby UW generated by the generation unit 32 based on the receiving-station operation time information. The reception standby UW is a reception UW that can be used as the first reception UW for receiving the first radio frame transmitted immediately after the start of the communication. In this example embodiment, since the error between the transmitting-station operation time information and the receiving-station operation time information is within the certain error, the generation unit 42 generates a reception UW identical to the transmission UW generated by the generation unit 32. The generation unit 42 periodically generates a reception standby UW based on the receiving-station operation time information at intervals of a predetermined cycle time and at timings at which the generation unit 32 generates a transmission standby UW, and thereby updates the reception standby UW.

When communication with the radio communication apparatus 30 is started, the generation unit 42 generates, for each radio frame, an ith reception UW for receiving an ith-transmitted radio frame after the start of communication based on an (i−1)th reception UW. When the state of the radio communication apparatus 40 changes to a communication state, the generation unit 42 determines that communication with the radio communication apparatus 30 is started. When communication with the radio communication apparatus 30 is started, the generation unit 42 uses the reception standby UW generated immediately before the communication is started as the first reception UW, updates, for each radio frame, the first reception UW (i−1) times, and thereby generates an ith reception UW by. It is considered that since the reception standby UW is used as the first reception UW, the generation unit 42 updates, for each radio frame, the reception standby UW generated immediately before the communication is started (i−1) times, and thereby generates the ith reception UW.

The generation unit 42 includes a reference-series output unit 421, a random-number output unit 422, and a conversion-series output unit 423.

The reference-series output unit 421 has a configuration basically similar to that of the reference-series output unit 321. Therefore, the reference-series output unit 421 will be described while omitting descriptions of structures/components similar to those of the reference-series output unit 321. The reference-series output unit 421 is configured to so as to be able to output a random number reference series, which is a pseudo-random number series, and outputs the random number reference series to the random-number output unit 422. The reference-series output unit 421 is configured so as to be able to generate a random number reference series identical to the random number reference series output from the reference-series output unit 321.

In a standby state before communication is started, the reference-series output unit 421 outputs, based on the receiving-station operation time information, a random number reference series, which is a pseudo-random number series and is identical to the random number reference series based on the transmitting-station operation time information, at intervals of a predetermined cycle time. The reference-series output unit 421 receives the receiving-station operation time information, and outputs the first random number reference series based on the receiving-station operation time information to the random-number output unit 422.

When communication is stared and the state of the radio communication apparatus 40 changes to a communication state, the reference-series output unit 421 outputs, for each radio frame, an ith random number reference series based on an (i−1)th random number reference series to the random-number output unit 422. The reference-series output unit 421 outputs an ith random number reference series identical to the ith random number reference series output from the reference-series output unit 321.

The reference-series output unit 421 includes the random-number reference-series generation circuit 50 shown in FIG. 5, and generates and outputs a random number reference series by using the random-number reference-series generation circuit 50.

Details of the reference-series output unit 421 will be described hereinafter with reference to FIG. 5. In the standby state, the reference-series output unit 421 inputs the receiving-station operation time information to the shift register 51 of the random-number reference-series generation circuit 50 at intervals of a predetermined cycle time and at timings at which a reception standby UW is generated. The reference-series output unit 421 shifts the shift register 51 a predetermined number of times by advancing the clock time of the clock provided in the random-number reference-series generation circuit 50 the predetermined number of times. After shifting the shift register 51 the predetermined number of times, the reference-series output unit 421 generates a first random number reference series by combining values P1 to PN output from the taps 52-1 to 52-N, and outputs the first random number reference series to the random-number output unit 422. After outputting the first random number reference series, the reference-series output unit 421 holds (i.e., retain) each of the values of the taps 52-1 to 52-N of the shift register 51.

When communication with the radio communication apparatus 30 is started, the reference-series output unit 421 advances the clock time of the clock provided in the random-number reference-series generation circuit 50 once (i.e., by one clock) in the state in which the corresponding values of the first random number reference series are held in the taps 52-1 to 52-N. After the shift register 51 is shifted once, the reference-series output unit 421 generates a second random number reference series by combining the values P1 to PN output from the taps 52-1 to 52-N. The reference-series output unit 421 outputs the second random number reference series to the random-number output unit 422. After outputting the second random number reference series, the reference-series output unit 421 holds each of the values of the taps 52-1 to 52-N.

The reference-series output unit 421 outputs a random number reference series for the second reception UW based on the reception standby UW identical to the transmission standby UW. Therefore, the reference-series output unit 421 outputs the second reception UW identical to the second transmission UW.

After that, the reference-series output unit 421 generates an (i−1)th random number reference series in a similar manner, holds each of the values of the taps 52-1 to 52-N, and advances the clock time of the clock provided in the random-number reference-series generation circuit 50 once before generating a radio frame. After the shift register 51 is shifted once, the reference-series output unit 421 generates an ith random number reference series by combining the values P1 to PN output from the taps 52-1 to 52-N. The reference-series output unit 421 outputs the ith random number reference series to the random-number output unit 422. After outputting the ith random number reference series, the reference-series output unit 421 holds each of the values of the taps 52-1 to 52-N.

The random-number output unit 422 will be described by referring to FIG. 3 again. The random-number output unit 422 holds a random-number table T1 identical to the random-number table held by the random-number output unit 322 shown in FIG. 6. The random-number output unit 422 receives the first random number reference series output from the reference-series output unit 421, and outputs a first output value to the conversion-series output unit 423 based on the random-number table T1. Further, the random-number output unit 422 receives the ith random number reference series output from the reference-series output unit 421, and outputs an ith output value to the conversion-series output unit 423 based on the random-number table T1.

Since the random-number output unit 422 receives a random number reference series identical to the random number reference series output from the reference-series output unit 321 and holds the random-number table T1 identical to that of the random-number output unit 322, the random-number output unit 422 outputs an output value identical to that output from the random-number output unit 322. That is, the random-number output unit 422 outputs a first output value identical to that of the random-number output unit 322 and outputs an ith output value identical to that of the random-number output unit 322.

The conversion-series output unit 423 basically has a configuration similar to that of the conversion-series output unit 323. Therefore, in the following description, the configuration of the conversion-series output unit 423 will be described while omitting descriptions of structures/components similar to those of the conversion-series output unit 323. The conversion-series output unit 423 receives the output value output from the random-number output unit 422 and outputs a conversion series, which is a pseudo-random number series. The conversion-series output unit 423 outputs the first conversion series, which is based on the first output value, as a reception standby UW that can be used as the first reception UW, and outputs an ith conversion series, which is based on the ith output value, as an ith reception UW.

The conversion-series output unit 423 includes the conversion-series generation circuit 80 shown in FIG. 7, and generates and outputs a GOLD series, which is a conversion series, by using the conversion-series generation circuit 80.

In the standby state, the conversion-series output unit 423 inputs the first output value output from the random-number output unit 422 to the shift registers 81 and 83 of the conversion-series generation circuit 80 at intervals of a predetermined cycle time and at timings at which a reception standby UW is generated. The conversion-series output unit 423 shifts the shift registers 81 and 83 31 times by advancing the clock time of the clock provided in the conversion-series generation circuit 80 31 times. The conversion-series output unit 423 holds a value output from the XOR circuit 87 every time the shift registers 81 and 83 are shifted. The conversion-series output unit 423 generates a first GOLD series by combining the 31 values output from the XOR circuit 87, and outputs the first GOLD series to the receiving unit 44 as a reception standby UW.

When communication with the radio communication apparatus 30 is started, the conversion-series output unit 423 inputs an ith output value output from the random-number output unit 422 to the shift registers 81 and 83 of the conversion-series generation circuit 80. The conversion-series output unit 423 shifts the shift registers 81 and 83 31 times by advancing the clock time of the clock provided in the conversion-series generation circuit 80 31 times. The conversion-series output unit 423 holds a value output from the XOR circuit 87 every time the shift registers 81 and 83 are shifted. The conversion-series output unit 423 generates an ith GOLD series by combining the 31 values output from the XOR circuit 87, and outputs the ith GOLD series to the receiving unit 44 as an ith reception UW.

Note that the random-number output unit 422 outputs an output value identical to that of the random-number output unit 322, and the conversion-series output unit 423 includes a conversion-series generation circuit 80 identical to that of the conversion-series output unit 323. Therefore, the conversion-series output unit 423 outputs a GOLD series identical to the GOLD series output from the conversion-series output unit 323. Further, the conversion-series output units 323 and 423 use GOLD series output from them as a transmission UW and a reception UW, respectively, so that the reception UW is identical to the transmission UW.

The receiving unit 44 will be described by referring FIG. 3 again. The receiving unit 44 corresponds to the receiving unit 22 in the first example embodiment. The receiving unit 44 uses the reception standby UW generated immediately before the start of the communication as the first reception UW, detects the first transmission UW identical to the first reception UW based on the first reception UW, and receives the first radio frame including the first reception UW. Upon detecting the first transmission UW, the receiving unit 44 changes the state of the radio communication apparatus 40 to a communication state. The receiving unit 44 detects an ith transmission UW identical to an ith reception UW based on an ith reception UW, and receives an ith radio frame including the ith reception UW.

Operation Example of Radio Communication System

Figure 8:
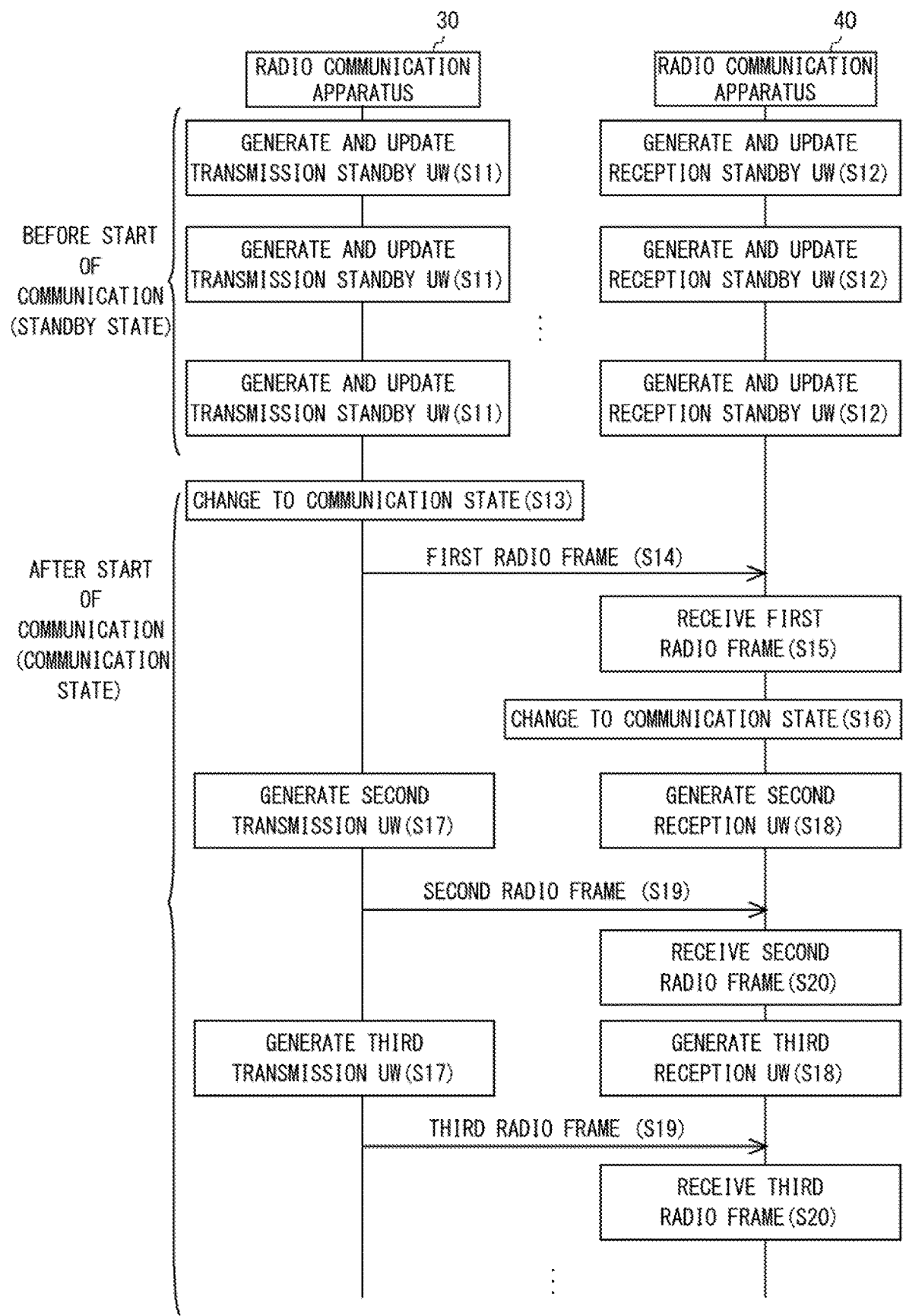
FIG. 8 shows an example of operations performed by the radio communication system according to the second example embodiment.

Next, an example of operations performed by the radio communication system 200 according to the second example embodiment will be described. Firstly, an example of operations representing the overall operations performed by the radio communication system 200 according to the second example embodiment will be described with reference to FIG. 8. FIG. 8 shows an example of operations performed by the radio communication system according to the second example embodiment, and is a sequence diagram showing the overall operations performed by the radio communication system according to the second example embodiment. The operations shown in FIG. 8 are performed after the radio communication apparatuses 30 and 40 are started.

In a standby state, the generation unit 32 generates a transmission standby UW that can be used as the first transmission UW to be added to the first radio frame based on transmitting-station operation time information, and thereby updates the transmission standby UW (Step S11). In the standby state, the step S11 is periodically and repeatedly performed at intervals of a predetermined cycle time.

In the standby state, the generation unit 42 generates a reception standby UW that can be used as the first reception UW for receiving the first radio frame based on receiving-station operation time information, and thereby updates the reception standby UW (Step S12). Since the error between the transmitting-station operation time information and the receiving-station operation time information is within the certain error, the generation unit 42 generates a reception standby UW identical to the transmission standby UW at a timing at which the generation unit 32 generates the transmission standby UW. In the standby state, the step S12 is periodically and repeatedly performed.

When the transmitting unit 34 receives data to be transmitted to the radio communication apparatus 40, it changes the state of the radio communication apparatus 30 to a communication state (Step S13).

The transmitting unit 34 divides the data to be transmitted to the radio communication apparatus 40, uses the transmission standby UW generated immediately before the start of the communication as the first transmission UW, and transmits the first radio frame including the first transmission UW and the divided data to the radio communication apparatus 40 (Step S14).

The receiving unit 44 uses the reception standby UW generated immediately before the start of the communication as the first reception UW, detects the first transmission UW identical to the first reception UW based on the first reception UW, and receives the first radio frame including the first transmission UW (Step S15).

Upon detecting the first transmission UW, the receiving unit 44 changes the state of the radio communication apparatus 40 to a communication state, and the state of the radio communication apparatus 40 changes to the communication state (Step S16).

The generation unit 32 generates a second transmission UW based on the first transmission UW (Step S17). The step S17 is performed after the transmitting unit 34 transmits the first radio frame to the radio communication apparatus 40 and before generating the second radio frame.

The generation unit 42 generates a second reception UW based on the first reception UW (Step S18). The step S18 is performed before the receiving unit 44 detects the first transmission UW and before the second radio frame is transmitted from the radio communication apparatus 40. The generation unit 42 generates a second reception UW identical to the second transmission UW based on the reception standby UW identical to the transmission standby UW. Note that the step S18 may be performed at the same timing as the step S17, or may not be performed at the same timing as the step S17.

The transmitting unit 34 transmits a second radio frame including the second transmission UW and the divided data to the radio communication apparatus 40 (Step S19).

The receiving unit 44 detects the second transmission UW identical to the second reception UW based on the second reception UW, and receives the second radio frame including the second transmission UW identical to the second reception UW (Step S20).

After that, the radio communication system 200 repeatedly performs the steps S17 to S20 until the communication is finished. Further, when the communication is finished, each of the radio communication apparatuses 30 and 40 changes its state from the communication state to a standby state, and repeatedly performs the steps S11 and S12 until the next communication is started.

The operations in the steps S17 to S20 can be described in a generalized manner as follows.

The generation unit 32 generates an ith transmission UW based on an (i−1)th transmission UW (Step S17). The step S17 is performed after the transmitting unit 34 transmits an (i−1)th radio frame to the radio communication apparatus 40 and before generating an ith radio frame.

The generation unit 42 generates an ith reception UW based on the reception standby UW, which is an (i−1)th reception UW (Step S18). The step S18 is performed before the receiving unit 44 detects an (i−1)th transmission UW and before an ith radio frame is transmitted from the radio communication apparatus 30. The generation unit 42 generates an ith reception UW identical to the ith transmission UW.

The transmitting unit 34 transmits an ith radio frame including the ith transmission UW and the divided data to the radio communication apparatus 40 (Step S19).

The receiving unit 44 detects the ith transmission UW identical to the ith reception UW based on the ith reception UW, and receives the ith radio frame including the ith transmission UW identical to the ith reception UW (Step S20).

<Details of Step S11>

Figure 9:
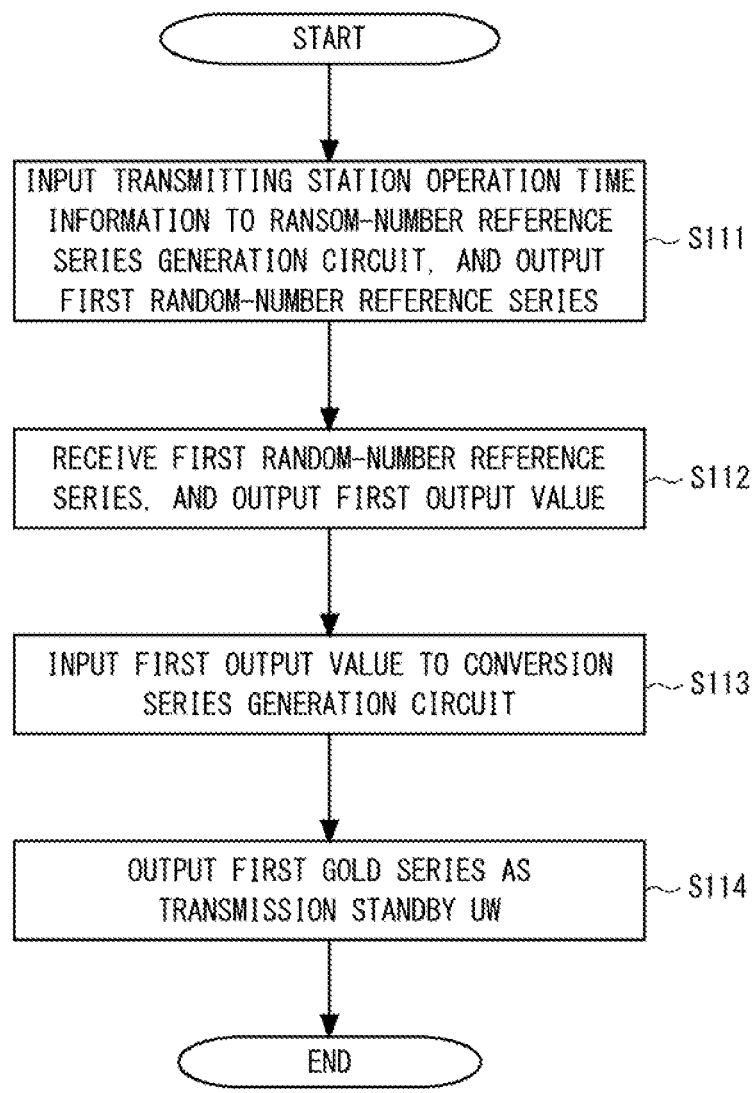
FIG. 9 shows an example of operations performed by the radio communication system according to the second example embodiment.

Next, details of the operation performed in the step S11 in FIG. 8 will be described with reference to FIG. 9. FIG. 9 shows an example of operations performed by the radio communication system according to the second example embodiment. FIG. 9 is a flowchart for explaining details of the operations performed by the generation unit 32 in the step S11 in FIG. 8, which is periodically and repeatedly performed at intervals of a predetermined cycle time.

The reference-series output unit 321 inputs transmitting-station operation time information to the shift register 51 of the random-number reference-series generation circuit 50, and outputs a first random number reference series to the random-number output unit 322 (Step S111).

The reference-series output unit 321 inputs each of a plurality of bits constituting the transmitting-station operation time information to a respective one of the taps 52-1 to 52-N. The reference-series output unit 321 shifts the shift register 51 a predetermined number of times by advancing the clock time of the clock provided in the random-number reference-series generation circuit 50 the predetermined number of times. The reference-series output unit 321 generates a first random number reference series by combining values P1 to PN output from the taps 52-1 to 52-N, and outputs the first random number reference series to the random-number output unit 322. After outputting the first random number reference series, the reference-series output unit 321 holds the values of the shift register 51.

The random-number output unit 322 receives the first random number reference series and outputs a first output value to the conversion-series output unit 323 based on the random-number table T1 (Step S112).

The conversion-series output unit 323 inputs the first output value to the shift registers 81 and 83 of the conversion-series generation circuit 80 (Step S113).

The conversion-series output unit 323 inputs the lower five bits of the output value output from the random-number output unit 322 to the taps 82-1 to 82-5 of the shift register 81. The conversion-series output unit 323 inputs the upper five bits of the output value output from the random-number output unit 322 to the taps 84-1 to 84-5 of the shift register 83. The conversion-series output unit 323 shifts the shift registers 81 and 83 31 times by advancing the clock time of the clock provided in the conversion-series generation circuit 80 31 times.

The conversion-series output unit 323 generates a first GOLD series based on the 31 values output from the XOR circuit 87, and outputs the first GOLD series to the transmitting unit 34 as the transmission standby UW that can be used as the first transmission UW (Step S114).

<Details of Step S12>

Next, details of the operation performed in the step S12 in FIG. 8 will be described. Since the step S12 in FIG. 8 is basically similar to the step S11 in FIG. 8, it will be described with reference to FIG. 9 while partially omitting the description as appropriate. The step S12 in FIG. 8 is repeatedly performed at intervals of a predetermined cycle time. Note that the difference between the steps S11 and S12 is that the transmitting-station operation time information in the step S11 is replaced by receiving-station operation time information, and the transmission standby UW in the step S11 is replaced by a reception standby UW.

The reference-series output unit 421 inputs the receiving-station operation time information to the shift register 51 of the random-number reference-series generation circuit 50, and outputs a first random number reference series to the random-number output unit 322 (Step S111).

The reference-series output unit 421 inputs each of a plurality of bits constituting the receiving-station operation time information to a respective one of the taps 52-1 to 52-N. The reference-series output unit 421 shifts the shift register 51 a predetermined number of times by advancing the clock time of the clock provided in the random-number reference-series generation circuit 50 the predetermined number of times. The reference-series output unit 421 generates a first random number reference series by combining values P1 to PN output from the taps 52-1 to 52-N, and outputs the first random number reference series to the random-number output unit 422. After outputting the first random number reference series, the reference-series output unit 321 holds the values of the shift register 51.

The random-number output unit 422 receives the first random number reference series and outputs a first output value to the conversion-series output unit 423 based on the random-number table T1 (Step S112).

The conversion-series output unit 423 inputs the first output value to the shift registers 81 and 83 of the conversion-series generation circuit 80 (Step S113).

The conversion-series output unit 423 inputs the lower five bits of the output value output from the random-number output unit 422 to the taps 82-1 to 82-5 of the shift register 81. The conversion-series output unit 423 inputs the upper five bits of the output value output from the random-number output unit 422 to the taps 84-1 to 84-5 of the shift register 83. The conversion-series output unit 423 shifts the shift registers 81 and 83 31 times by advancing the clock time of the clock provided in the conversion-series generation circuit 80 31 times.

The conversion-series output unit 423 generates a first GOLD series based on the 31 values output from the XOR circuit 87, and outputs the first GOLD series to the receiving unit 44 as the reception standby UW that can be used as the first reception UW (Step S114).

<Details of Step S17>

Figure 10:
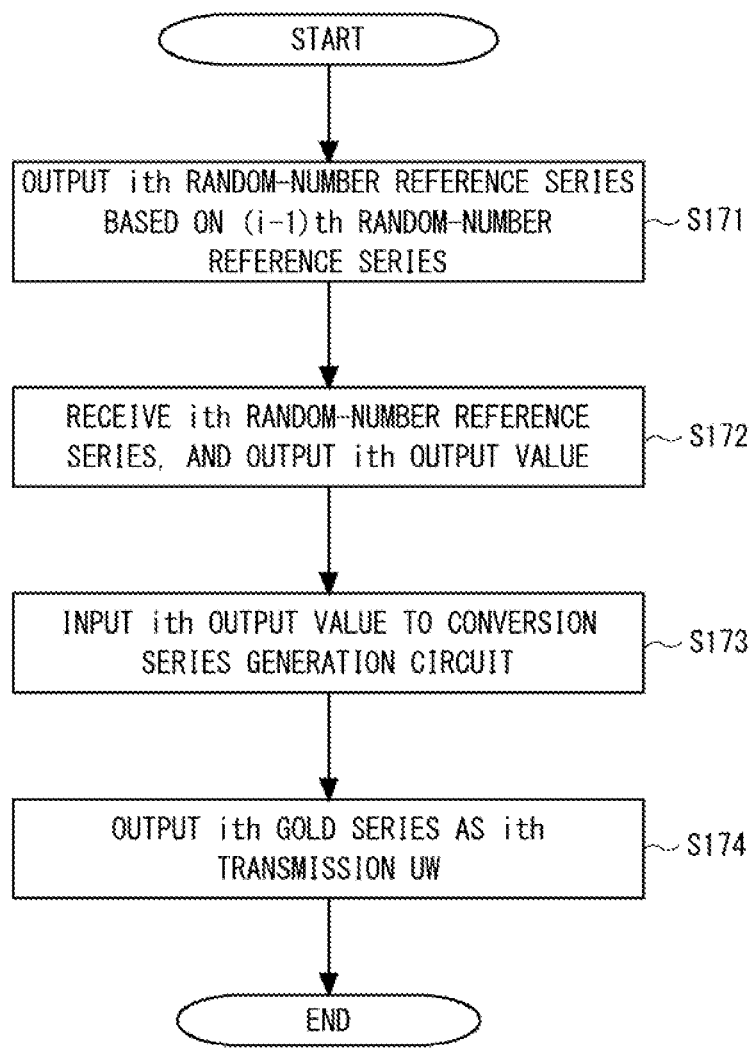
FIG. 10 shows an example of operations performed by the radio communication system according to the second example embodiment.

Next, details of the operation in the step S17 in FIG. 8, in which the generation unit 32 generates an ith transmission UW, will be described with reference to FIG. 10. FIG. 10 shows an example of operations performed by the radio communication system according to the second example embodiment. FIG. 10 is a flowchart for explaining details of the operation performed by the generation unit 32 in the step S17 in FIG. 8. The operations shown in FIG. 10 are repeatedly performed on a frame-by-frame basis. Note that the operations shown in FIG. 10 are performed in a state in which the shift register 51 of the reference-series output unit 321 is holding a value of an (i−1)th random number reference series.

The reference-series output unit 321 outputs an ith random number reference series, which is based on an (i−1)th random number reference series held in the shift register 51 of the random-number reference-series generation circuit 50, to the random-number output unit 322 (Step S171).

The reference-series output unit 321 shifts the shift register 51 in which the value of the (i−1)th random number reference series is held once by advancing the clock time of the clock provided in the random-number reference-series generation circuit 50 once. The reference-series output unit 321 generates an ith random number reference series by combining values P1 to PN output from the taps 52-1 to 52-N, and outputs the ith random number reference series to the random-number output unit 322.

The random-number output unit 322 receives an ith random number reference series and outputs an ith output value to the conversion-series output unit 323 based on the random-number table T1 (Step S172).

The conversion-series output unit 323 inputs the ith output value to the shift registers 81 and 83 of the conversion-series generation circuit 80 (Step S173).

The conversion-series output unit 323 inputs the lower five bits of the output value output from the random-number output unit 322 to the taps 82-1 to 82-5 of the shift register 81. The conversion-series output unit 323 inputs the upper five bits of the output value output from the random-number output unit 322 to the taps 84-1 to 84-5 of the shift register 83. The conversion-series output unit 323 shifts the shift registers 81 and 83 31 times by advancing the clock time of the clock provided in the conversion-series generation circuit 80 31 times.

The conversion-series output unit 323 generates an ith GOLD series based on the 31 values output from the XOR circuit 87, and outputs the ith GOLD series to the transmitting unit 34 as an ith transmission UW (Step S174).

<Details of Step S18>

Next, details of the operation performed in the step S18 in FIG. 8 will be described. Since the step S18 in FIG. 8 is basically similar to the step S17 in FIG. 8, it will be described with reference to FIG. 10 while partially omitting the description as appropriate. The step S18 in FIG. 8 is repeatedly performed on a frame-by-frame basis. Note that the difference between the steps S17 and S18 is that the transmission UW in the step S17 is replaced by a reception UW. Further, the step S18 in FIG. 8 is performed in a state in which the shift register 51 is holding a value of an (i−1)th random number reference series for an (i−1)th reception UW.

The reference-series output unit 421 outputs an ith random number reference series, which is based on the (i−1)th random number reference series held in the shift register 51 of the random-number reference-series generation circuit 50, to the random-number output unit 422 (Step S171).

The reference-series output unit 421 shifts the shift register 51 in which the value of the (i−1)th random number reference series is held once by advancing the clock time of the clock that supplies a clock signal to the random-number reference-series generation circuit 50 once. The reference-series output unit 421 generates an ith random number reference series by combining values P1 to PN output from the taps 52-1 to 52-N, and outputs the ith random number reference series to the random-number output unit 422.

The random-number output unit 422 receives the ith random number reference series and outputs an ith output value to the conversion-series output unit 423 based on the random-number table T1 (Step S172).

The conversion-series output unit 423 inputs the ith output value to the shift registers 81 and 83 of the conversion-series generation circuit 80 (Step S173).

The conversion-series output unit 423 inputs the lower five bits of the output value output from the random-number output unit 422 to the taps 82-1 to 82-5 of the shift register 81. The conversion-series output unit 423 inputs the upper five bits of the output value output from the random-number output unit 422 to the taps 84-1 to 84-5 of the shift register 83. The conversion-series output unit 423 shifts the shift registers 81 and 83 31 times by advancing the clock time of the clock provided in the conversion-series generation circuit 80 31 times.

The conversion-series output unit 423 generates an ith GOLD series based on the 31 values output from the XOR circuit 87, and outputs the ith GOLD series to the receiving unit 44 as an ith reception UW (Step S174).

As described above, since the radio communication apparatus 30 generates a different transmission UW for each radio frame to be transmitted to the radio communication apparatus 40, it can prevent a third party from intercepting contents of communication. Further, since the radio communication apparatus 30 generates a transmission standby UW that is used as the first transmission UW by using transmitting-station operation time information, the radio communication apparatus 30 can generate a different transmission UW every time it performs communication with the radio communication apparatus 40. Since the first transmission UW is changed every time the radio communication apparatus 30 performs communication with the radio communication apparatus 40, the radio communication apparatus 30 can generate a different ith transmission UW every time it performs communication with the radio communication apparatus 40. Therefore, even if a third party continuously monitors communication between the radio communication apparatuses 30 and 40, they cannot find out a transmission UW used in the communication between the radio communication apparatuses 30 and 40. Therefore, according to the radio communication apparatus 30 in accordance with the second example embodiment, it is possible to prevent contents of communication from being intercepted.

Further, the radio communication apparatus 40 generates, based on receiving-station operation time information, a reception standby UW that is used as the first reception UW and is identical to the transmission standby UW used as the first transmission UW. Note that the radio communication apparatus 40 generates an ith reception UW identical to the ith transmission UW. Therefore, even when the radio communication apparatus 30 generates a different transmission UW for each radio frame and for each communication, the radio communication apparatus 30 can detect a transmission UW included in a radio frame transmitted from the radio communication apparatus 30 and thereby can receive the radio frame. That is, according to the radio communication system 200 including the radio communication apparatuses 30 and 40, it is possible to perform normal communication while preventing a third party from intercepting contents of the communication.

Further, in a standby state before communication is started, the radio communication apparatuses 30 and 40 periodically update a transmission standby UW and a reception standby UW at intervals of a predetermined cycle time. Therefore, according to the radio communication system 200 in accordance with the second example embodiment, it is possible to prevent contents of communication from being intercepted more effectively than the first example embodiment.

Moreover, since the radio communication apparatuses 30 and 40 update a transmission UW and a reception UW for each radio frame and for each communication, a third party cannot generate a UW used in the communication between the radio communication apparatuses 30 and 40. Therefore, for example, a third party cannot generate jamming radio waves by reproducing a UW used in the communication between the radio communication apparatuses 30 and 40. Further, even if a third party transmits radio waves in order to jam the communication, the radio communication apparatus 40 does not receive these radio waves because the UW is different. That is, by using the radio communication system 200 according to this example embodiment, a third party can neither generate effective jamming radio waves nor transmit effective jamming radio waves. Therefore, according to the radio communication system 200 in accordance with the second example embodiment, it is possible to prevent a third party from intercepting contents of communication, and to prevent a third party from making an attack by jamming the communication.

Modified Example

In the second example embodiment, the generation unit 32 may not include the random-number output unit 322. That is, the generation unit 32 may include only the reference-series output unit 321 and the conversion-series output unit 323. Similarly, the generation unit 42 may not include the random-number output unit 422, and may include only the reference-series output unit 421 and the conversion-series output unit 423.

In this case, the reference-series output unit 321 selects arbitrary 10 bits of the P1 to PN output from the random-number reference-series generation circuit 50, and outputs the selected bits to the conversion-series output unit 323. Then, the conversion-series output unit 323 inputs the lower five bits of the selected 10 bits to the shift register 81 and inputs the upper five bits to the shift register 83. Further, the reference-series output unit 421 selects the same 10 bits of the P1 to PN output from the random-number reference-series generation circuit 50 as those selected by the reference-series output unit 321, and outputs the selected bits to the conversion-series output unit 423. Then, the conversion-series output unit 423 inputs the lower five bits of the selected 10 bits to the shift register 81 and inputs the upper five bits to the shift register 83. As described above, even if the generation units 32 and 42 do not include the random-number output units 322 and 422, respectively, in the second example embodiment, effects similar to those obtained in the above-described second example embodiment can be obtained.

Third Example Embodiment

Next, a third example embodiment will be described. The third example embodiment is an improved example of the second example embodiment. Note that the third example embodiment may be an improved example of the modified example of the second example embodiment.

Overview

Firstly, before explaining details of the third example embodiment, an overview of the third example embodiment will be described. The second example embodiment has been described on the assumption that the error between the transmitting-station operation time information and the receiving-station operation time information is within a certain error, so that a transmission UW and a reception UW identical to each other are generated. However, it is conceivable that the error between the transmitting-station operation time information and the receiving-station operation time information is large, so that a transmitting UW and a receiving UW are not identical to each other. In this case, the radio communication apparatus serving as the receiving station cannot detect a transmission UW included in a transmitted radio frame, and hence cannot perform normal communication. Therefore, this example embodiment is configured so that even when the error between the transmitting-station operation time information and the receiving-station operation time information is large, and hence a transmitting UW and a receiving UW are not identical to each other, normal communication is performed.

Figure 11:
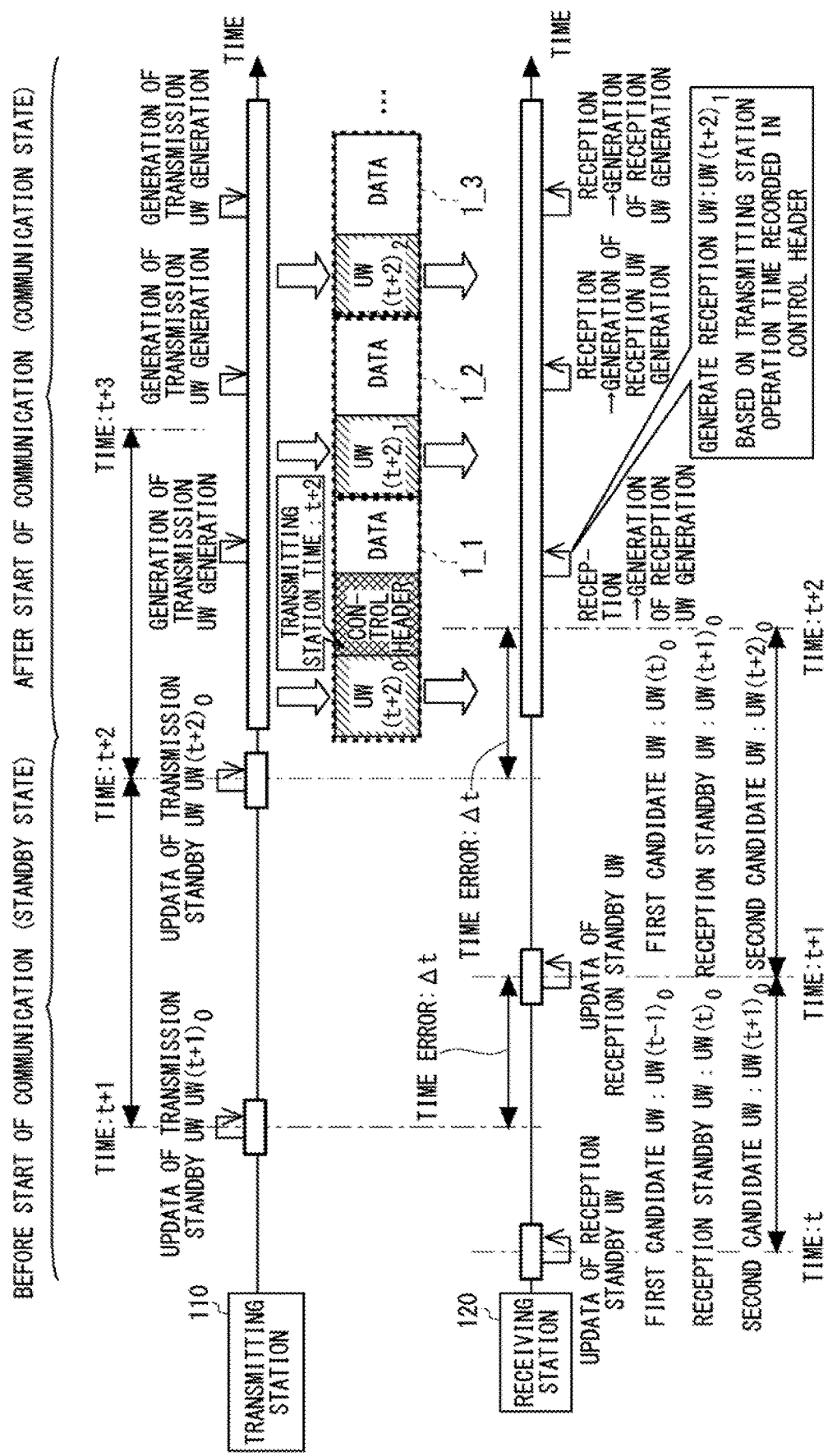
FIG. 11 is a diagram for explaining an outline of operations performed by radio communication apparatuses according to a third example embodiment.

An outline of operations performed by radio communication apparatuses 110 and 120 according to the third example embodiment will be described with reference to FIG. 11. FIG. 11 is a diagram for explaining an outline of operations performed by the radio communication apparatuses according to the third example embodiment. FIG. 11 shows timings at which UWs are generated in the radio communication apparatuses 110 and 120, and the generated UWs.

The horizontal axis in FIG. 11 is an axis indicating the time. The upper side of FIG. 11 shows timings at which UWs are generated in the radio communication apparatus 110, which is the transmitting station. The lower side of FIG. 11 shows timings at which UWs are generated in the radio communication apparatus 120, which is the receiving station. Note that, similarly to FIG. 4, $UW(t)_0$ indicates a UW (a transmission UW or a reception UW) that is generated when the operation time indicated by operation time information (transmitting-station operation time information or receiving-station operation time information) is a time t. Further, for example, $UW(t+2)_2$ indicates a UW which was originally a $UW(t+2)_0$, i.e., a UW generated based on the transmitting-station operation time information, and has been updated twice when the operation time is a time (t+2).

Similarly to the second example embodiment, in a standby state, the radio communication apparatus 110, which is a transmitting station, generates a transmission standby UW that can be used as the first transmission UW based on the transmitting-station operation time information at intervals of a predetermined cycle time. As shown in FIG. 11, the radio communication apparatus 110 generates a transmission standby UW when the operation time used for the operation of the radio communication apparatus 110 is a time (t+1), a time (t+2), . . . .

In the standby state, the radio communication apparatus 120, which is a receiving station, generates a reception standby UW that is used as the first reception UW based on the receiving-station operation time information at intervals of a predetermined cycle time.

Here, it is assumed that, as shown in FIG. 11, there is a time error $\Delta t$ between the operation time of the radio communication apparatus 120 and that of the radio communication apparatus 110. In this case, if the radio communication apparatus 120 generates a reception standby UW when the operation time of the radio communication apparatus 120 is a time (t+1), a time (t+2), . . . , the reception standby UW could be different from the transmission standby UW generated by the radio communication apparatus 110.

Therefore, the radio communication apparatus 120 generates a reception standby UW at intervals of a predetermined cycle time, and further generates a first candidate UW based on receiving-station operation time information corresponding to an operation time one cycle time earlier, and a second candidate UW based on receiving-station operation time information corresponding to an operation time one cycle time later. Specifically, as shown in FIG. 11, for example, the radio communication apparatus 120 generates, at a time at which the operation time of the radio communication apparatus 120 is a time (t+1), a reception standby UW based on receiving-station operation time information corresponding to the time (t+1). Further, the radio communication apparatus 120 generates a first candidate UW based on receiving-station operation time information corresponding to a time t, which is one cycle time earlier than the time (t+1), and generates a second candidate UW based on receiving-station operation time information corresponding to a time (t+2), which is one cycle time later than the time (t+1). As described above, the radio communication apparatus 120 generates the reception standby UW, the first candidate UW, and the second candidate UW at intervals of a predetermined cycle time in the standby state so that it can normally perform communication even when the reception UW identical to the transmission UW is not generated. Further, the radio communication apparatus 120 is configured so that, when communication is started, it can detect the first transmission UW based on the reception standby UW, the first candidate UW, and the second candidate UW, and thereby can receive the first radio frame 1_1.

Further, when communication is started, the radio communication apparatus 110 transmits the first radio frame 1_1, in which the transmitting-station operation time information used to generate the first transmission UW is set, so that the radio communication apparatus 120 can generate a reception UW identical to the second transmission UW. Specifically, the radio communication apparatus 110 sets the transmitting-station operation time information used to generate the first transmission UW in a control header of the first radio frame 1_1 immediately after the start of the communication, and transmits the first radio frame 1_1 including the transmitting-station operation time information to the radio communication apparatus 120. The radio communication apparatus 120 acquires the transmitting-station operation time information used to generate the first transmission UW from the received first radio frame 1_1 based on the reception standby UW, the first candidate UW, and the second candidate UW. The radio communication apparatus 120 generates a reception UW identical to the second transmission UW based on the acquired transmitting-station operation time information.

As described above, the radio communication apparatus 110 notifies the radio communication apparatus 120 of the transmitting-station operation time information used to generate the first transmission UW, and thereby notifies the radio communication apparatus 120 as to which operation time the transmission UW was generated. Further, the radio communication apparatus 120 can find out which operation time the transmission UW was generated based on the notified (i.e., received) transmitting-station operation time information. By generating a reception UW so that the second reception UW becomes identical to the transmission UW based on the notified (i.e., received) transmitting-station operation time information, the radio communication apparatus 120 can normally perform communication even when there is an error between the operation times, and hence the transmission UW and the reception UW are not identical to each other.

Configuration Example of Radio Communication System

Figure 12:
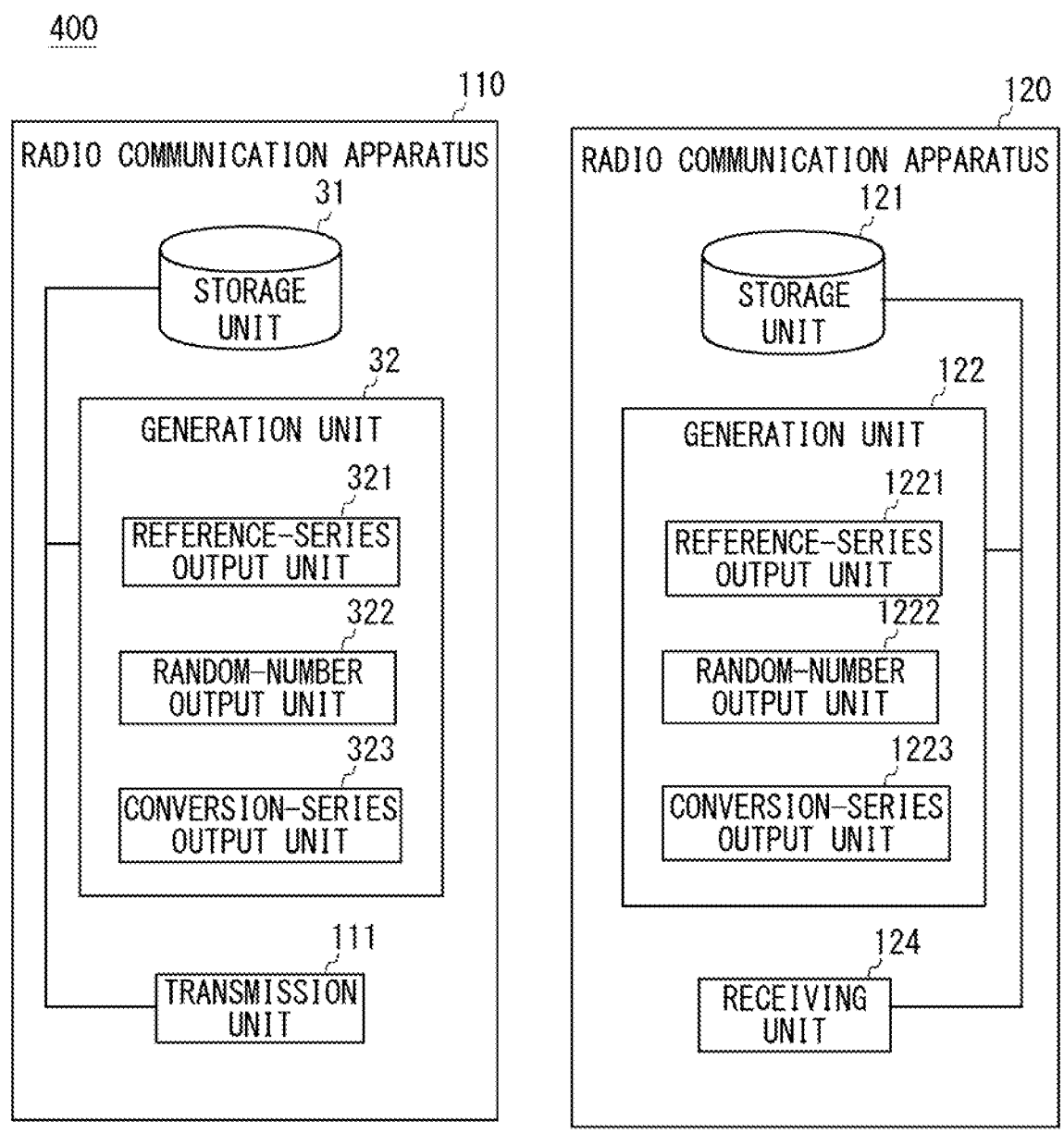
FIG. 12 shows an example of a configuration of a radio communication system according to the third example embodiment.

An example of a configuration of a radio communication system 400 according to a third example embodiment will be described with reference to FIG. 12. FIG. 12 shows an example of the configuration of the radio communication system according to the third example embodiment. The radio communication system 400 includes a radio communication apparatus 110 and a radio communication apparatus 120. The radio communication system 400 is basically similar to that according to the second example embodiment, except that the radio communication apparatuses 30 and 40 according to the second example embodiment are replaced by the radio communication apparatuses 110 and 120, respectively. Therefore, the description of the example of the configuration of the radio communication system 400 is omitted.

Configuration Example of Radio Communication Apparatus

Next, the radio communication apparatus 110 will be described. The radio communication apparatus 110 includes a storage unit 31, a generation unit 32, and a transmitting unit 111. The radio communication apparatus 110 has a configuration that is obtained by replacing the transmitting unit 34 in the second example embodiment by the transmitting unit 111. The examples of the configurations of the storage unit 31 and the generation unit 32 are similar to those in the second example embodiment, and therefore the descriptions thereof are omitted.

The transmitting unit 111 changes the state of the radio communication apparatus 110 to a communication state when data is input to an input device provided in the radio communication apparatus 110, or when data is input from other communication apparatuses. The transmitting unit 111 divides data to be transmitted to the radio communication apparatus 120 into those for respective radio frames.

The transmitting unit 111 acquires, from the generation unit 32, transmitting-station operation time information used to generate a transmission standby UW generated immediately before the start of communication. In other words, the transmitting unit 111 acquires, from the generation unit 32, transmitting-station operation time information that was used to generate the first transmission UW generated before the state of the radio communication apparatus was changed to the communication state.

The transmitting unit 111 uses the transmission standby UW as the first transmission UW, and sets the first transmission UW and the acquired transmitting-station operation time information in the control header of the first radio frame. The transmitting unit 111 generates a first radio frame including the first transmission UW, the acquired transmitting-station operation time information, and transmission data for the first radio frame. The transmitting unit 111 transmits the first radio frame to the radio communication apparatus 120. The transmitting unit 111 generates an ith radio frame including an ith transmission UW and transmission data for an ith radio data, and transmits the ith radio frame to the radio communication apparatus 120.

Next, the radio communication apparatus 120 will be described. The radio communication apparatus 120 includes a storage unit 121, a generation unit 122, and a receiving unit 124. The radio communication apparatus 120 has a configuration that is obtained by replacing the storage unit 41, the generation unit 42, and the receiving unit 44 in the second example embodiment by the storage unit 121, the generation unit 122, and the receiving unit 124, respectively. Note that the configuration of the radio communication apparatus 120 will be described while omitting descriptions of structures/components similar to those in the second example embodiment.

The storage unit 121 stores receiving-station operation time information. The storage unit 121 stores a reception standby UW, a first candidate UW, and a second candidate UW generated by the generation unit 122.

Before communication with the radio communication apparatus 110 is started, the generation unit 122 generates, based on the receiving-station operation time information, a reception standby UW corresponding to the transmission standby UW at intervals of a predetermined cycle time and at timings at which a reception standby UW is generated. The generation unit 122 generates, based on the receiving-station operation time information, a reception standby UW corresponding to the transmission standby UW at an operation time that is determined in advance between the radio communication apparatuses 110 and 120. That is, when the error between the operation time of the radio communication apparatus 110 and the operation time of the radio communication apparatus 120 is within the certain error, the generation unit 122 generates, based on the receiving-station operation time information, a reception standby UW at an operation time at which the transmission standby UW and the reception standby UW are identical to each other. At a timing at which the reception standby UW is generated, the generation unit 122 generates a first candidate UW based on one cycle earlier time information indicating receiving-station operation time information one cycle time earlier than the current time. The generation unit 122 generates a second candidate UW based on one cycle later time information indicating receiving-station operation time information one cycle time later than the current time.

When communication with the radio communication apparatus 110 is started, the generation unit 122 acquires the transmitting-station operation time information included in the control header of the first radio frame from the receiving unit 124. The generation unit 122 specifies, among the reception standby UW, the first candidate UW, and the second candidate UW, a reception UW identical to the transmission UW based on the acquired transmitting-station operation time information. The generation unit 122 updates the specified reception UW and generates a second reception UW for a second radio frame. For third and subsequent reception UWs, the generation unit 122 generates, for each radio frame, an ith reception UW based on an (i−1)th reception UW as in the case of the second example embodiment.

The generation unit 122 includes a reference-series output unit 1221, a random-number output unit 1222, and a conversion-series output unit 1223.

The reference-series output unit 1221 includes a random-number reference-series generation circuit 50, and generates and outputs a random number reference series by using the random-number reference-series generation circuit 50. The reference-series output unit 1221 calculates, at the timing at which the reception standby UW is generated, one cycle earlier time information indicating operation time information one cycle time earlier than the current time, and one cycle later time information indicating operation time information one cycle time later than the current time.

In the standby state, the reference-series output unit 1221 inputs the receiving-station operation time information to the shift register 51 of the random-number reference-series generation circuit 50 at intervals of a predetermined cycle time and at timings at which a reception standby UW is generated. The reference-series output unit 1221 shifts the shift register 51 a predetermined number of times by advancing the clock time of the clock provided in the random-number reference-series generation circuit 50 the predetermined number of times. The reference-series output unit 1221 generates a first random number reference series for generating a reception standby UW by combining values P1 to PN output from the taps 52-1 to 52-N, and outputs the first random number reference series for generating the reception standby UW to the random-number output unit 1222.

In the standby state, the reference-series output unit 1221 inputs the one cycle earlier time information to the shift register 51 of the random-number reference-series generation circuit 50 at intervals of a predetermined cycle time and at timings at which a reception standby UW is generated. The reference-series output unit 1221 shifts the shift register 51 a predetermined number of times by advancing the clock time of the clock provided in the random-number reference-series generation circuit 50 the predetermined number of times. The reference-series output unit 1221 generates a first random number reference series for the first candidate UW by combining values P1 to PN output from the taps 52-1 to 52-N, and outputs the first random number reference series for the first candidate UW to the random-number output unit 1222.

In the standby state, the reference-series output unit 1221 inputs the one cycle later time information to the shift register 51 of the random-number reference-series generation circuit 50 at intervals of a predetermined cycle time and at timings at which a reception standby UW is generated. The reference-series output unit 1221 shifts the shift register 51 a predetermined number of times by advancing the clock time of the clock provided in the random-number reference-series generation circuit 50 the predetermined number of times. The reference-series output unit 1221 generates a first random number reference series for the second candidate UW by combining values P1 to PN output from the taps 52-1 to 52-N, and outputs the first random number reference series for the second candidate UW to the random-number output unit 1222.

When communication with the radio communication apparatus 110 is started and the first radio frame is received, the reference-series output unit 1221 acquires the transmitting-station operation time information included in the control header of the first radio frame from the receiving unit 124. The reference-series output unit 1221 reads out the reception standby UW, the first candidate UW, and the second candidate UW from the storage unit 121, and specifies, among the reception standby UW, the first candidate UW, and the second candidate UW, a reception UW identical to the transmission UW based on the acquired transmitting-station operation time information.

The reference-series output unit 1221 may specify the reception UW identical to the transmission UW based on the acquired transmitting-station operation time information by determining whether or not the receiving-station operation time information used to generate the reception standby UW, the first candidate UW, and the second candidate UW matches the acquired transmitting-station operation time information. Alternatively, the reference-series output unit 1221 may specify, among the reception standby UW, the first candidate UW, and the second candidate UW, a reception UW that matches the first transmission UW by generating a reception UW based on the acquired transmitting-station operation time information.

Note that the reference-series output unit 1221 may correct the receiving-station operation time information based on the acquired transmitting-station operation time information by overwriting the receiving-station operation time information stored in the storage unit 121 with the acquired transmitting-station operation time information. By correcting the receiving-station operation time information based on the acquired transmitting-station operation time information, the reference-series output unit 1221 can prevent the error between the receiving-station operation time information and the transmitting-station operation time information from increasing.

The reference-series output unit 1221 inputs the specified reception UW to the shift register 51 of the random-number reference-series generation circuit 50. The reference-series output unit 1221 shifts the shift register 51 once by advancing the clock time of the clock provided in the random-number reference-series generation circuit 50 once. The reference-series output unit 1221 generates a second random number reference series by combining values P1 to PN output from the taps 52-1 to 52-N, and outputs the second random number reference series to the random-number output unit 1222. After outputting the second random number reference series, the reference-series output unit 1221 holds each of the values of the taps 52-1 to 52-N of the shift register 51.

The reference-series output unit 1221 generates third and subsequent reception UWs in a manner similar to that in the second example embodiment. The reference-series output unit 1221 advances the clock time of the clock provided in the random-number reference-series generation circuit 50 once in a state in which an (i−1)th random number reference series is held in the shift register 51. The reference-series output unit 1221 generates an ith random number reference series by combining values P1 to PN output from the taps 52-1 to 52-N, and outputs the ith random number reference series to the random-number output unit 1222. After outputting the ith random number reference series, the reference-series output unit 1221 holds each of the values of the taps 52-1 to 52-N.

The random-number output unit 1222 corresponds to the random-number output unit 422 according to the second example embodiment, and has a configuration basically similar to that of the random-number output unit 422. Therefore, descriptions of structures/components of the random-number output unit 1222 that are similar to those of the random-number output unit 422 are omitted as appropriate. The random-number output unit 1222 receives a first random number reference series for the reception standby UW output from the reference-series output unit 1221, and outputs a first output value for the reception standby UW to the conversion-series output unit 1223 based on the random-number table T1. The random-number output unit 1222 receives the first random number reference series for the first candidate UW output from the reference-series output unit 1221, and outputs a first output value for the first candidate UW to the conversion-series output unit 1223 based on the random-number table T1. The random-number output unit 1222 receives the first random number reference series for the second candidate UW output from the reference-series output unit 1221, and outputs a first output value for the second candidate UW to the conversion-series output unit 1223 based on the random-number table T1. Further, the random-number output unit 1222 receives an ith random number reference series output from the reference-series output unit 1221, and outputs an ith output value to the conversion-series output unit 1223 based on the random-number table T1.

The conversion-series output unit 1223 corresponds to the conversion-series output unit 423 according to the second example embodiment, and has a configuration basically similar to that of the conversion-series output unit 423. Therefore, descriptions of structures/components of the conversion-series output unit 1223 that are similar to those of the conversion-series output unit 423 are omitted as appropriate.

In the standby state, the conversion-series output unit 1223 inputs the first output value for the reception standby UW, which has been output from the random-number output unit 1222, to the shift registers 81 and 83 of the conversion-series generation circuit 80 at intervals of a predetermined cycle time and at timings at which a reception standby UW is generated. The conversion-series output unit 1223 shifts the shift registers 81 and 83 31 times by advancing the clock time of the clock provided in the conversion-series generation circuit 80 31 times. The conversion-series output unit 1223 holds a value output from the XOR circuit 87 every time the shift registers 81 and 83 are shifted. The conversion-series output unit 1223 generates a first GOLD series by combining the 31 values output from the XOR circuit 87, and outputs the first GOLD series to the receiving unit 124 as a reception standby UW. The conversion-series output unit 1223 stores the reception standby UW in the storage unit 121.

In the standby state, the conversion-series output unit 1223 inputs the first output value for the first candidate UW, which has been output from the random-number output unit 1222, to the shift registers 81 and 83 of the conversion-series generation circuit 80 at intervals of a predetermined cycle time and at timings at which a reception standby UW is generated in the standby state. The conversion-series output unit 1223 generates a first GOLD series by combining the 31 values output from the XOR circuit 87 as in the case of the reception standby UW, and outputs the first GOLD series to the receiving unit 124 as the first candidate UW. The conversion-series output unit 1223 stores the first candidate UW in the storage unit 121.

In the standby state, the conversion-series output unit 1223 inputs the first output value for the second candidate UW, which has been output from the random-number output unit 1222, to the shift registers 81 and 83 of the conversion-series generation circuit 80 at intervals of a predetermined cycle time and at timings at which a reception standby UW is generated. The conversion-series output unit 1223 generates a first GOLD series by combining the 31 values output from the XOR circuit 87 as in the case of the reception standby UW, and outputs the first GOLD series to the receive unit 124 as the second candidate UW. The conversion-series output unit 1223 stores the second candidate UW in the storage unit 121.

When communication with the radio communication apparatus 30 is started, the conversion-series output unit 1223 inputs an ith output value output from the random-number output unit 1222 to the shift registers 81 and 83 of the conversion-series generation circuit 80. The conversion-series output unit 1223 shifts the shift registers 81 and 83 31 times by advancing the clock time of the clock provided in the conversion-series generation circuit 80 31 times. The conversion-series output unit 1223 holds a value output from the XOR circuit 87 every time the shift registers 81 and 83 are shifted. The conversion-series output unit 1223 generates an ith GOLD series by combining the 31 values output from the XOR circuit 87, and outputs the ith GOLD series to the receiving unit 124 as an ith reception UW.

The receiving unit 124 receives, as the first radio frame, a radio frame including one of the reception standby UW, the first candidate UW, and the second candidate UW, which could be used as the first reception UW. The receiving unit 124 detects the first transmission UW based on the reception standby UW, the first candidate UW, and the second candidate UW. The receiving unit 124 receives, as the first radio frame, a radio frame including the first transmission UW identical to one of the reception standby UW, the first candidate UW, and the second candidate UW. The receiving unit 124 acquires the transmitting-station operation time information used to generate the first transmission UW from the control header of the first radio frame, and transmits the acquired transmitting-station operation time information to the generation unit 122. When the receiving unit 124 detects the first transmission UW, it changes the state of the radio communication apparatus 120 to the communication state. The receiving unit 124 detects an ith transmission UW identical to an ith reception UW based on an ith reception UW, and receives an ith radio frame including the ith reception UW.

Operation Example of Radio Communication System

Figure 13:
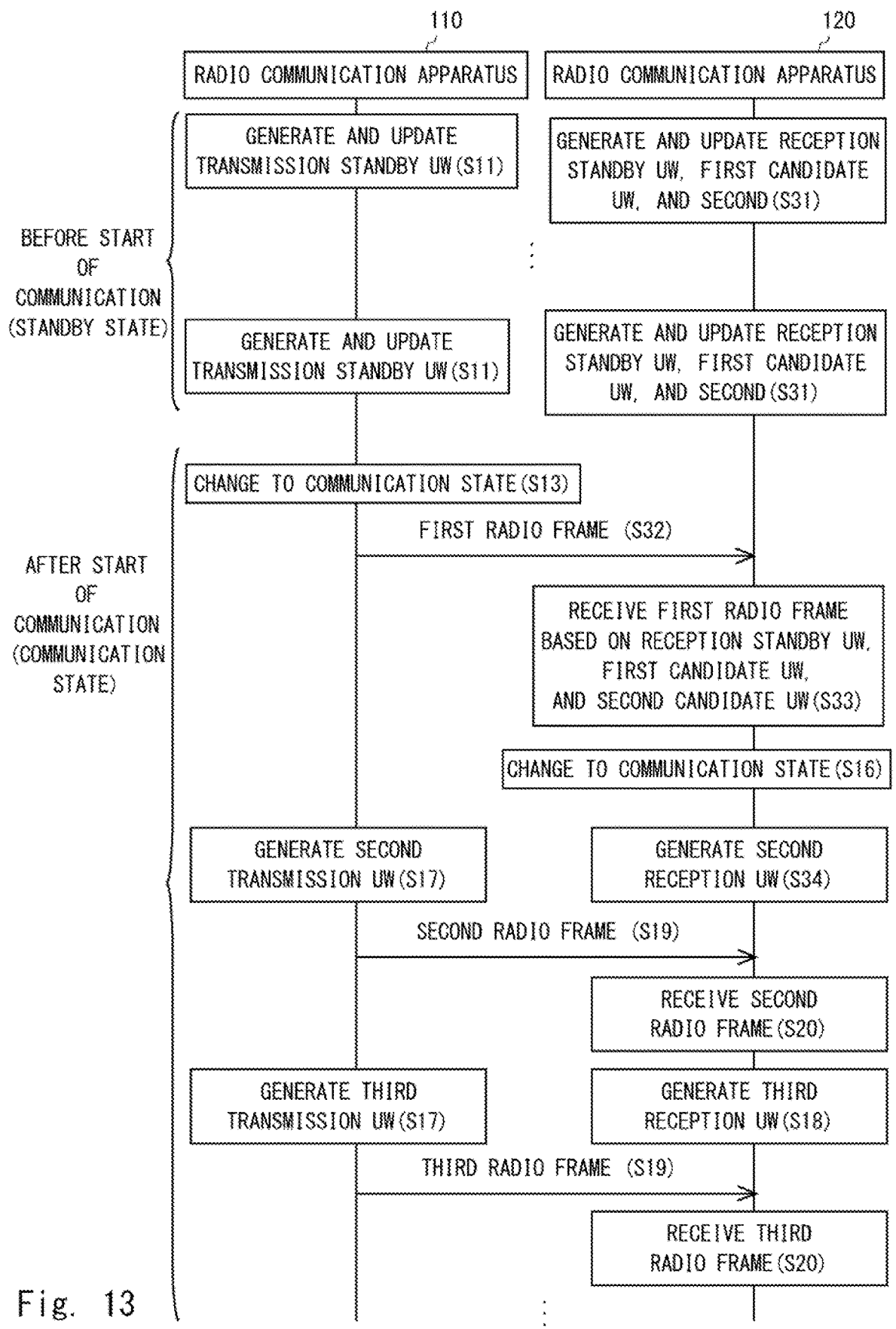
FIG. 13 shows an example of operations performed by the radio communication system according to the third example embodiment.

Next, an example of operations performed by the radio communication system 400 according to the third example embodiment will be described with reference to FIG. 13. FIG. 13 shows an example of operations performed by the radio communication system according to the third example embodiment. FIG. 13 corresponds to FIG. 8, and reference numerals (or symbols) similar to those in FIG. 8 are assigned to steps in which operations similar to those in FIG. 8 are performed. In FIG. 13, operations that are indicated by the same reference numerals (or symbols) as those in FIG. 8 are similar to those in the second example embodiment, and therefore their descriptions will be omitted as appropriate. The operations shown in FIG. 13 are performed after the radio communication apparatuses 110 and 120 are started.

In a standby state, the generation unit 32 generates a transmission standby UW that can be used as the first transmission UW based on transmitting-station operation time information, and thereby updates the transmission standby UW (Step S11). In the standby state, the step S11 is periodically and repeatedly performed at intervals of a predetermined cycle time.

In the standby state, the generation unit 122 generates a reception standby UW based on receiving-station operation time information, a first candidate UW based on one cycle earlier time information, and a second candidate UW based on one cycle later time information, and thereby updates the reception standby UW, the first candidate UW, and the second candidate UW (Step S31). In the standby state, the step S31 is periodically and repeatedly performed at intervals of a predetermined cycle time.

The reference-series output unit 1221 calculates, at the timing at which the reception standby UW is generated, one cycle earlier time information indicating operation time information one cycle time earlier than the current time, and one cycle later time information indicating operation time information one cycle time later than the current time.

The reference-series output unit 1221 inputs the receiving-station operation time information to the shift register 51 of the random-number reference-series generation circuit 50, and outputs a first random number reference series for the reception standby UW. The random-number output unit 1222 receives the first random number reference series for the reception standby UW and outputs a first output value for the reception standby UW based on the random-number table T1. The conversion-series output unit 1223 outputs a first GOLD series based on the first output value for the reception standby UW to the receiving unit 124 as the reception standby UW. The conversion-series output unit 1223 stores the reception standby UW in the storage unit 121.

The reference-series output unit 1221 inputs the one cycle earlier time information to the shift register 51 of the random-number reference-series generation circuit 50, and outputs a first random number reference series for the first candidate UW. The random-number output unit 1222 receives the first random number reference series for the first candidate UW, and outputs a first output value for the first candidate UW based on the random-number table T1. The conversion-series output unit 1223 outputs a first GOLD series based on the first output value for the first candidate UW to the receiving unit 124 as the first candidate UW. The conversion-series output unit 1223 stores the first candidate UW in the storage unit 121.

The reference-series output unit 1221 inputs the one cycle later time information to the shift register 51 of the random-number reference-series generation circuit 50, and outputs a first random number reference series for the second candidate UW. The random-number output unit 1222 receives the first random number reference series for the second candidate UW, and outputs a first output value for the second candidate UW based on the random-number table T1. The conversion-series output unit 1223 outputs a first GOLD series based on the first output value for the second candidate UW to the receiving unit 124 as the second candidate UW. The conversion-series output unit 1223 stores the second candidate UW in the storage unit 121.

When the transmitting unit 111 receives data to be transmitted to the radio communication apparatus 40, it changes the state of the radio communication apparatus 30 to a communication state, and the state of the radio communication apparatus 30 changes to the communication state (Step S13).

The transmitting unit 111 transmits a first radio frame including the first transmission UW, the transmitting-station operation time information used to generate the first transmission UW, and transmission data for the first radio frame to the radio communication apparatus 120 (Step S32).

The transmitting unit 111 acquires, from the generation unit 32, the transmitting-station operation time information used to generate a transmission standby UW generated before the state of the radio communication apparatus was changed to the communication state. The transmitting unit 111 uses the transmission standby UW as the first transmission UW, and sets the first transmission UW and the transmitting-station operation time information acquired from the generation unit 32 in the control header of the first radio frame. The transmitting unit 111 generates a first radio frame including the first transmission UW, the transmitting-station operation time information used to generate the first transmission UW, and transmission data for the first radio frame, and transmits the generated radio frame to the radio communication apparatus 120.

When communication is started, the receiving unit 124 receives the first radio frame based on the reception standby UW, the first candidate UW, and the second candidate UW (Step S33).

The receiving unit 124 uses the reception standby UW as the first reception UW, and detects the first transmission UW based on the first reception UW, the first candidate UW, and the second candidate UW. The receiving unit 124 receives, as the first radio frame, a radio frame including a transmission UW identical to one of the first reception UW, the first candidate UW, and the second candidate UW. The receiving unit 124 acquires the transmitting-station operation time information used to generate the first transmission UW from the control header of the first radio frame, and transmits the acquired transmitting-station operation time information to the generation unit 122.

When the receiving unit 124 detects the first transmission UW, it changes the state of the radio communication apparatus 120 to a communication state (Step S16).

The generation unit 32 generates a second transmission UW based on the first transmission UW (Step S17). The step S17 is performed after the transmitting unit 34 transmits the first radio frame to the radio communication apparatus 40 and before generating the second radio frame.

The generation unit 122 generates a second reception UW based on the transmitting-station operation time information acquired from the first radio frame, the first reception UW, the first candidate UW, and the second candidate UW (Step S34).

The reference-series output unit 1221 acquires the transmitting-station operation time information included in the control header of the first radio frame from the receiving unit 124. The reference-series output unit 1221 specifies, among the first reception UW, the first candidate UW, and the second candidate UW, a reception UW identical to the transmission UW based on the acquired transmitting-station operation time information. The reference-series output unit 1221 inputs the specified reception UW to the shift register 51 of the random-number reference-series generation circuit 50. The reference-series output unit 1221 generates a second random number reference series by shifting the shift register 51 once, and outputs the second random number reference series to the random-number output unit 1222. After outputting the second random number reference series, the reference-series output unit 1221 holds each of the values of the taps 52-1 to 52-N of the shift register 51.

The random-number output unit 1222 receives the second random number reference series and outputs a second output value based on the random-number table T1. The conversion-series output unit 1223 outputs a second GOLD series based on the second output value to the receiving unit 124 as the second reception UW.

The transmitting unit 111 transmits the second radio frame including the second transmission UW and transmission data to the radio communication apparatus 40 (Step S19).

The receiving unit 124 detects a second transmission UW identical to the second reception UW based on the second reception UW, and receives a second radio frame including the second transmission UW identical to the second reception UW (Step S20).

After that, the radio communication system 400 repeatedly performs the steps S17 to S20 until the communication is finished. Further, when the communication is finished, each of the radio communication apparatuses 110 and 120 changes its state to a standby state, and repeatedly performs the steps S11 and S31 until the next communication is started.

The operations in the steps S17 to S20 can be described in a generalized manner as follows.

The generation unit 32 generates an ith transmission UW based on an (i−1)th transmission UW (Step S17). The step S17 is performed after the transmitting unit 111 transmits an (i−1)th radio frame to the radio communication apparatus 40 and before generating an ith radio frame.

The generation unit 122 generates an ith reception UW based on an (i−1)th reception UW (Step S18). The step S18 is performed before the receiving unit 124 detects an (i−1)th transmission UW and an ith radio frame is transmitted from the radio communication apparatus 110. Note that since the generation unit 122 generates a second reception UW identical to the second transmission UW based on the transmitting-station operation time information acquired from the first radio frame, it generates an ith reception UW identical to the ith transmission UW.

The transmitting unit 111 transmits an ith radio frame including the ith transmission UW and transmission data to the radio communication apparatus 120 (Step S19).

The receiving unit 124 detects an ith transmission UW identical to an ith reception UW based on the ith reception UW, and receives an ith radio frame including the ith transmission UW identical to the ith reception UW (Step S20).

As described above, even when the second example embodiment is modified to the third example embodiment as described above, effects similar to those obtained in the second example embodiment can be obtained. Further, in this example embodiment, the radio communication apparatus 120 generates a reception waiting UW, a first candidate UW, and a second candidate UW at intervals of a predetermined cycle time. Therefore, even when there is an error between the operation time of the radio communication apparatus 110 and the operation time of the radio communication apparatus 120, and hence a reception UW identical to the transmission UW cannot be generated, the radio communication apparatuses 110 and 120 can normally communicate with each other.

Further, in this example embodiment, the radio communication apparatus 110 transmits a first radio frame including transmitting-station operation time information used to generate the first transmission UW to the radio communication apparatus 120. Therefore, the radio communication apparatus 120 can generate, for the second and subsequent radio frames, a reception UW identical to the transmission UW without generating a plurality of reception UWs. Therefore, according to the radio communication system 400 in accordance with the fourth example embodiment, even when the error between the transmitting-station operation time information and the receiving-station operation time information is large, it is possible to perform normal communication while preventing contents of the communication from being intercepted.

Other Example Embodiment

Figure 14:
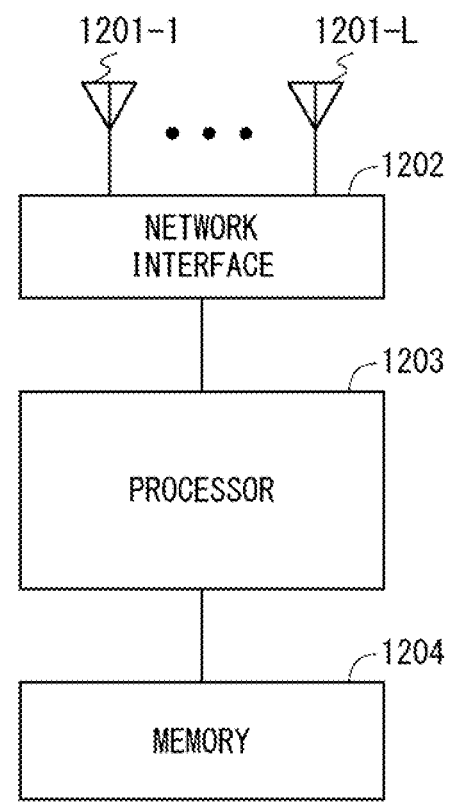
FIG. 14 is a block diagram showing an example of a hardware configuration of a computer (an information processing apparatus) capable of implementing a radio apparatus according to each example embodiment.

Each of the radio communication apparatuses 10, 20, 30, 40, 110 and 120 according to the above-described example embodiments (hereinafter referred to as a radio communication apparatus 10 or the like) may have the following hardware configuration. FIG. 14 is a block diagram showing an example of a hardware configuration of a computer (an information processing apparatus) capable of implementing a radio apparatuses according to each example embodiment.

Referring to FIG. 14, the radio communication apparatus 10 or the like includes antennas 1201-1 to 1201-L (L is an integer equal to or greater than one), a network interface 1202, a processor 1203, and a memory 1204. The plurality of antennas 1201-1 to 1201-L and the network interface 1202 are used to communicate with other radio communication apparatuses. The network interface 1202 may include, for example, a network interface card (NIC) in conformity with IEEE (Institute of Electrical and Electronics Engineers) 802.11 series, IEEE 802.3 series, or the like.

The processor 1203 may perform the processes of the radio communication apparatus 10 or the like described by using a flowchart in the above-described example embodiments by loading software (a computer program) from the memory 1204 and executing the loaded software. The processor 1203 may be, for example, a microprocessor, an MPU (Micro Processing Unit), or a CPU (Central Processing Unit). The processor 1203 may include a plurality of processors.

The memory 1204 is formed by a combination of a volatile memory and a nonvolatile memory. The memory 1204 may include a storage located remotely from the processor 1203. In this case, the processor 1203 may access the memory 1204 through an I/O (Input/Output) interface (not shown).

In the example shown in FIG. 14, the memory 1204 is used to store a group of software modules. The processor 1203 may load the group of software modules from the memory 1204 and execute the loaded software module, thereby performing the processes of the radio communication apparatus 10 or the like described in the above-described example embodiments.

As described above with reference to FIG. 14, each of the processors included in the radio communication apparatus 10 or the like executes one or a plurality of programs including a group of instructions for causing a computer to perform the algorithm described above with reference to the drawings.

In the above-described examples, the program may be stored in various types of non-transitory computer readable media and thereby supplied to the computer. The non-transitory computer readable media includes various types of tangible storage media. Examples of the non-transitory computer readable media include a magnetic recording medium (such as a flexible disk, a magnetic tape, and a hard disk drive) and a magneto-optic recording medium (such as a magneto-optic disk). Further, examples of the non-transitory computer readable media include CD-ROM (Read Only Memory), CD-R, and CD-R/W. Further, examples of the non-transitory computer readable media include a semiconductor memory. The semiconductor memory includes, for example, a mask ROM, a PROM (Programmable ROM), an EPROM (Erasable PROM), a flash ROM, and a RAM (Random Access Memory). Further, the programs may be supplied to the computer by using various types of transitory computer readable media. Examples of the transitory computer readable media include an electrical signal, an optical signal, and an electromagnetic wave. The transitory computer readable media can be used to supply a program to a computer through a wired communication line (e.g., an electric wire and an optical fiber) or a radio communication line.

Further, the present disclosure is not limited to the above-described example embodiments and various changes may be made therein without departing from the spirit and scope of the present disclosure. Further, the present disclosure may be implemented by combining example embodiments with one another.

Further, the whole or part of the example embodiments disclosed above can be described as, but not limited to, the following supplementary notes.

Supplementary Note 1

A radio communication apparatus comprising:
a generation unit configured to generate a first unique word based on operation time information of the radio communication apparatus before communication with another radio communication apparatus is started, and generate, for each radio frame, an ith unique word (i: an integer equal to or greater than two) based on an (i−1)th unique word when the communication is started; and
a transmitting unit configured to transmit a first radio frame including the first unique word and an ith radio frame including the ith unique word to the other radio communication apparatus.

Supplementary Note 2

The radio communication apparatus described in Supplementary note 1, wherein
the generation unit comprises:
a reference-series output unit configured to output a first reference series based on the operation time information, and output, for each radio frame, an ith reference series based on an (i−1)th reference series, the first reference series being a pseudo-random number series; and
a conversion-series output unit configured to output a first conversion series and output, for each radio frame, an ith conversion series, the first reference series being a pseudo-random number series, and the ith conversion series being a pseudo-random number series, and
the conversion-series output unit outputs the first conversion series based on the first reference series as the first unique word, and outputs the ith conversion series based on the ith reference series as the ith unique word.

Supplementary Note 3

The radio communication apparatus described in Supplementary note 2, wherein
the generation unit further comprises a random-number output unit configured to output a first output value and an ith output value based on a random-number table,
the random-number output unit outputs the first output value based on the first reference series, and outputs, for each radio frame, the ith output value based on the ith reference series, and
the conversion-series output unit outputs the first conversion series based on the first output value as the first unique word, and outputs the ith conversion series based on the ith output value as the ith unique word.

Supplementary Note 4

The radio communication apparatus described in Supplementary note 2 or 3, wherein
the reference-series output unit comprises:
a shift register comprising a plurality of the taps, the shift register being configured to input a plurality of bits constituting the operation time information to the plurality of taps;
a feedback tap configured to specify, among the plurality of taps, taps of which tap values are fed back to the shift register; and
an arithmetic circuit configured to calculate an exclusive OR of values output from the taps, of which tap values are fed back to the shift register, and feed back the calculated value to the shift register, and
the reference-series output unit shifts the shift register a predetermined number of times and thereby outputs the first reference series based on values output from the plurality of taps.

Supplementary Note 5

The radio communication apparatus described in any one of Supplementary notes 1 to 4, wherein the transmitting unit transmits the first radio frame including the operation time information and the first unique word.

Supplementary Note 6

The radio communication apparatus described in any one of Supplementary notes 1 to 5, wherein the generation unit periodically updates the first unique word before the communication is started.

Supplementary Note 7

A radio communication apparatus comprising:
a generation unit configured to generate a first reception unique word corresponding to a first transmission unique word based on second operation time information of the radio communication apparatus before communication with another radio communication apparatus is started, the second operation time information corresponding to first operation time information that the other radio communication apparatus uses to generate the first transmission unique word; and
a receiving unit configured to receive a radio frame including the first transmission unique word based on the first reception unique word, wherein
the generation unit generates, for each radio frame, an ith reception unique word (i: an integer equal to or greater than two) based on an (i−1)th reception unique word when the communication is started, the ith reception unique word corresponding to an ith transmission unique word generated by the other radio communication apparatus, and
the receiving unit receives a radio frame including the ith transmission unique word based on the ith reception unique word.

Supplementary Note 8

The radio communication apparatus described in Supplementary note 7, wherein the generation unit comprises:

a reference-series output unit configured to output, based on the second operation time information, a first reception reference series corresponding to a first transmission reference series generated by another radio communication apparatus, and output, for each radio frame, an ith reception reference series corresponding to an ith transmission reference series generated by the other radio communication apparatus based on an (i−1)th reception reference series, the first reference series being a pseudo-random number series; and a conversion-series output unit configured to output a first reception conversion series corresponding to a first transmission conversion series generated by the other radio communication apparatus, and output, for each radio frame, an ith reception conversion series corresponding to an ith transmission conversion series generated by the other radio communication apparatus, and the conversion-series output unit outputs the first reception conversion series based on the first reception reference series as the first reception unique word, and outputs the ith reception conversion series based on the ith reception reference series as the ith reception unique word.

Supplementary Note 9

The radio communication apparatus described in Supplementary note 8, wherein the generation unit further comprises a random-number output unit configured to output, based on a random-number table, a first reception output value corresponding to a first transmission output value output from the other radio communication apparatus, and output, for each radio frame, an ith reception output value corresponding to an ith transmission output value output from the other radio communication apparatus, the random-number output unit outputs the first reception output value based on the first reception reference series, and outputs the ith reception output value based on the ith reception reference series, and the conversion-series output unit outputs the first reception conversion series based on the first reception output value as the first reception unique word, and outputs the ith reception conversion series based on the ith reception output value as the ith reception unique word.

Supplementary Note 10

The radio communication apparatus described in Supplementary note 8 or 9, wherein the reference-series output unit comprises:

a shift register comprising a plurality of the taps, the shift register being configured to input a plurality of bits constituting the second operation time information to the plurality of taps;

a feedback tap configured to specify, among the plurality of taps, taps of which tap values are fed back to the shift register; and an arithmetic circuit configured to calculate an exclusive OR of values of the taps, of which tap values are fed back to the shift register, and feed back the calculated value to the shift register, and the reference-series output unit shifts the shift register a predetermined number of times and thereby outputs the first reception reference series based on values output from the plurality of taps.

Supplementary Note 11

The radio communication apparatus described in any one of Supplementary notes 7 to 10, wherein the generation unit periodically updates the first reception unique word at intervals of a predetermined cycle time before the communication is started, and periodically generates a first candidate unique word based on third operation time information corresponding to a time the cycle time earlier than a time indicated by the second operation time information, and a second candidate unique word based on fourth operation time information corresponding to a time the cycle time later than the time indicated by the second operation time information, and the receiving unit receives a radio frame including one of the first reception unique word, the first candidate unique word, and the second candidate unique word.

Supplementary Note 12

The radio communication apparatus described in Supplementary note 11, wherein when the receiving unit receives a radio frame including one of the first reception unique word, the first candidate unique word, and the second candidate unique word, it acquires operation time information included in the received radio frame as the first operation time information, and the generation unit specifies, among the first reception unique word, the first candidate unique word, and the second candidate unique word, a reception unique word corresponding to the first transmission unique word based on the first operation time information, and generates a second reception unique word based on the specified reception unique word.

Supplementary Note 13

The radio communication apparatus described in Supplementary note 12, wherein the generation unit corrects an operation time of the radio communication apparatus based on the first operation time information.

Supplementary Note 14

A radio communication method performed by a radio communication apparatus, comprising:

generating a first unique word based on operation time information of the radio communication apparatus before communication with another radio communication apparatus is started;

transmitting a first radio frame including the first unique word to the other radio communication apparatus when the communication is started;

generating, for each radio frame, an ith unique word (i: an integer equal to or greater than two) based on an (i−1)th unique word; and transmitting an ith radio frame including the ith unique word to the other radio communication apparatus.

Supplementary Note 15

A radio communication method performed by a radio communication apparatus, comprising:

generating a first reception unique word corresponding to a first transmission unique word based on second operation time information of the radio communication apparatus before communication with another radio communication apparatus is started, the second operation time information corresponding to first operation time information that the other radio communication apparatus uses to generate the first transmission unique word;

receiving a radio frame including the first transmission unique word based on the first reception unique word when the communication is started;

generating, for each radio frame, an ith reception unique word (i: an integer equal to or greater than two) based on an (i−1)th reception unique word, the ith reception unique word corresponding to an ith transmission unique word generated by the other radio communication apparatus; and receiving a radio frame including the ith transmission unique word based on the ith reception unique word.

Supplementary Note 16

A non-transitory computer readable medium storing a radio communication program performed by a radio communication apparatus, the radio communication program includes processes including:

generating a first unique word based on operation time information of the radio communication apparatus before communication with another radio communication apparatus is started;

transmitting a first radio frame including the first unique word to the other radio communication apparatus when the communication is started;

generating, for each radio frame, an ith unique word (i: an integer equal to or greater than two) based on an (i−1)th unique word; and transmitting an ith radio frame including the ith unique word to the other radio communication apparatus.

Supplementary Note 17

A non-transitory computer readable medium storing a radio communication program performed by a radio communication apparatus, the radio communication program includes processes including:

generating a first reception unique word corresponding to a first transmission unique word based on second operation time information of the radio communication apparatus before communication with another radio communication apparatus is started, the second operation time information corresponding to first operation time information that the other radio communication apparatus uses to generate the first transmission unique word;

receiving a radio frame including the first transmission unique word based on the first reception unique word when the communication is started;

generating, for each radio frame, an ith reception unique word (i: an integer equal to or greater than two) based on an (i−1)th reception unique word, the ith reception unique word corresponding to an ith transmission unique word generated by the other radio communication apparatus; and receiving a radio frame including the ith transmission unique word based on the ith reception unique word.

Supplementary Note 18

A radio communication system comprising:
a first radio communication apparatus; and
a second radio communication apparatus, wherein
the first radio communication apparatus
generates a first transmission unique word based on first operation time information of the first radio communication apparatus before communication with the second radio communication apparatus is started, and generate, for each radio frame, an ith transmission unique word (i: an integer equal to or greater than two) based on an (i−1)th transmission unique word when the communication is started, and transmits a first radio frame including the first transmission unique word to the second radio communication apparatus, and transmits an ith radio frame including the ith transmission unique word to the second radio communication apparatus, and the second radio communication apparatus
generates, before the communication is started, a first reception unique word corresponding to the first transmission unique word based on second operation time information of the second radio communication apparatus, corresponding to the first operation time information, and generates, when the communication is started, for each radio frame, an ith reception unique word corresponding to the ith transmission unique word based on an (i−1)th reception unique word, and receives the first radio frame based on the first reception unique word, and receives the ith radio frame based on the ith reception unique word.

Supplementary Note 19

The radio communication system described in Supplementary note 18, wherein the first radio communication apparatus transmits the first radio frame including the first operation time information and the first transmission unique word, and the second radio communication apparatus periodically updates the first reception unique word at intervals of a predetermined cycle time before the communication is started, and periodically generates a first candidate unique word based on third operation time information corresponding to a time the cycle time earlier than a time indicated by the second operation time information, and a second candidate unique word based on fourth operation time information corresponding to a time the cycle time later than the time indicated by the second operation time information, and receives a radio frame including one of the first reception unique word, the first candidate unique word, and the second candidate unique word.

According to the present disclosure, it is possible to provide a radio communication apparatus and a radio communication method capable of preventing contents of communication from being intercepted.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a radio communication line.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

What is claimed is:

1. A radio communication apparatus comprising:
   at least one memory storing instructions; and
   at least one processor configured to execute the instructions to:
   generate a first unique word based on operation time information of the radio communication apparatus before communication with another radio communication apparatus is started, and generate, for each radio frame, an ith unique word based on an (i−1)th unique word when the communication is started, wherein i is an integer equal to or greater than two;
   transmit a first radio frame including the first unique word and an ith radio frame including the ith unique word to the another radio communication apparatus;
   output a first reference series based on the operation time information, and output, for each radio frame, an ith reference series based on an (i−1)th reference series, the first reference series being a pseudo-random number series;
   output a first output value based on the first reference series and based on a random-number table, and output, for each radio frame, and an ith output value based on the ith reference series and based on the random-number table; and
   output a first conversion series based on the first output value as the first unique word, and output, for each radio frame, an ith conversion series based on the ith output value as the ith unique word, the ith conversion series being a pseudo-random number series.

2. The radio communication apparatus according to claim 1, wherein
   the radio communication apparatus further comprises:
   a shift register comprising a plurality of taps, the shift register configured to input a plurality of bits constituting the operation time information to the plurality of taps;
   a feedback tap configured to specify, among the plurality of taps, taps of which tap values are to be fed back to the shift register; and
   an arithmetic circuit configured to calculate an exclusive OR of values output from the specified taps, and feed back the calculated value to the shift register, and
   the at least one processor is configured to execute the instructions to shift the shift register a predetermined number of times and to output the first reference series based on values output from the plurality of taps.

3. The radio communication apparatus according to claim 1, wherein the at least one processor is configured to execute the instructions to transmit the first radio frame including the operation time information and the first unique word.

4. The radio communication apparatus according to claim 1, wherein the at least one processor configured to execute the instructions to periodically update the first unique word before the communication is started.

5. A radio communication apparatus comprising:
   at least one memory acquiring storing instructions and
   at least one processor configured to execute the instructions to:
   generate a first reception unique word corresponding to a first transmission unique word based on second operation time information of the radio communication apparatus before communication with another radio communication apparatus is started, the second operation time information corresponding to first operation time information that the another radio communication apparatus uses to generate the first transmission unique word;
   receive a radio frame including the first transmission unique word based on the first reception unique word;
   generate, for each radio frame, an ith reception unique word based on an (i−1)th reception unique word when the communication is started, the ith reception unique word corresponding to an ith transmission unique word generated by the another radio communication apparatus, wherein i is an integer equal to or greater than two;
   receive a radio frame including the ith transmission unique word based on the ith reception unique word;
   output, based on the second operation time information, a first reception reference series corresponding to a first transmission reference series generated by the another radio communication apparatus, and output, for each radio frame, an ith reception reference series corresponding to an ith transmission reference series generated by the another radio communication apparatus based on an (i−1)th reception reference series, the first reference series being a pseudo-random number series;
   output a first reception output value corresponding to a first transmission output value output from the another radio communication apparatus, and output, for each radio frame, an ith reception output value corresponding to an ith transmission output value output from the another radio communication apparatus, wherein the first reception output value is output based on the first reception reference series and a random-number table, and the ith reception output value is output based on the ith reception reference series and based on the random-number table; and
   output a first reception conversion series corresponding to a first transmission conversion series generated by the another radio communication apparatus, and output, for each radio frame, an ith reception conversion series corresponding to an ith transmission conversion series generated by the another radio communication apparatus, wherein the first reception conversion is output series based on the first reception output value as the first reception unique word, and wherein the ith reception conversion series is output based on the ith reception output value as the ith reception unique word.

6. The radio communication apparatus according to claim 5, wherein
   the radio communication apparatus further comprises:

a shift register comprising a plurality of taps, the shift register configured to input a plurality of bits constituting the second operation time information to the plurality of taps;
a feedback tap configured to specify, among the plurality of taps, taps of which tap values are to be fed back to the shift register; and
an arithmetic circuit configured to calculate an exclusive OR of values output from the specified taps, and feed back the calculated value to the shift register, and
the at least one processor is configured to execute the instructions to shift the shift register a predetermined number of times to output the first reception reference series based on values output from the plurality of taps.

* * * * *